United States Patent
Akkurt et al.

(10) Patent No.: US 11,694,095 B2
(45) Date of Patent: Jul. 4, 2023

(54) INTEGRATING GEOSCIENCE DATA TO PREDICT FORMATION PROPERTIES

(71) Applicant: Schlumberger Technology Corporation, Sugar Land, TX (US)

(72) Inventors: Ridvan Akkurt, London (GB); David Psaila, London (GB)

(73) Assignee: Schlumberger Technology Corporation, Sugar Land, TX (US)

(*) Notice: Subject to any disclaimer, the term of this patent is extended or adjusted under 35 U.S.C. 154(b) by 690 days.

(21) Appl. No.: 16/499,310

(22) PCT Filed: May 7, 2018

(86) PCT No.: PCT/US2018/031295
§ 371 (c)(1),
(2) Date: Sep. 29, 2019

(87) PCT Pub. No.: WO2018/208634
PCT Pub. Date: Nov. 15, 2018

(65) Prior Publication Data
US 2021/0110280 A1    Apr. 15, 2021

Related U.S. Application Data

(60) Provisional application No. 62/503,249, filed on May 8, 2017.

(51) Int. Cl.
*G06N 5/04* (2023.01)
*G06N 20/10* (2019.01)
(Continued)

(52) U.S. Cl.
CPC ............... *G06N 5/04* (2013.01); *G01V 5/10* (2013.01); *G01V 5/12* (2013.01); *G01V 11/00* (2013.01);
(Continued)

(58) Field of Classification Search
CPC ............ G06N 5/04; G06N 5/02; G06N 20/10; G01V 5/10; G01V 5/12; G01V 11/00;
(Continued)

(56) References Cited

U.S. PATENT DOCUMENTS 6,675,101 B1 * 1/2004 Shray ..................... G01V 11/00
702/6
9,536,208 B1   1/2017 Kakde et al.
(Continued)

FOREIGN PATENT DOCUMENTS

WO    2009129083 A1    10/2009
WO    2011075280 A2    6/2011

OTHER PUBLICATIONS

International Preliminary Report on Patentability for the counterpart International patent application PCT/US2018/031295 dated Nov. 21, 2019.
(Continued)

*Primary Examiner* — Marcus H Taningco
(74) *Attorney, Agent, or Firm* — Jeffrey D. Frantz

(57) ABSTRACT

A method includes receiving well log data for a plurality of wells. A flag is generated based at least partially on the well log data. The wells are sorted into groups based at least partially on the well log data, the flag, or both. A model is built for each of the wells based at least partially on the well log data, the flag, and the groups.

26 Claims, 16 Drawing Sheets

(51) Int. Cl.
*G01V 5/10* (2006.01)
*G01V 5/12* (2006.01)
*G01V 11/00* (2006.01)
*G06N 5/02* (2023.01)
*G01V 1/50* (2006.01)

(52) U.S. Cl.
CPC .............. *G06N 5/02* (2013.01); *G06N 20/10* (2019.01); *G01V 1/50* (2013.01); *G01V 2210/6244* (2013.01); *G01V 2210/6246* (2013.01)

(58) Field of Classification Search
CPC ............. G01V 1/50; G01V 2210/6244; G01V 2210/6246; G01V 2210/1299; G01V 2210/1429; G01V 2210/6163; G01V 2210/6167; G01V 2210/6169; G01V 1/306; G01V 2210/624
See application file for complete search history.

(56) References Cited

U.S. PATENT DOCUMENTS

| | | | |
|---|---|---|---|
| 10,670,761 B2* | 6/2020 | Wang | ........................ G01V 1/50 |
| 2008/0162098 A1 | 7/2008 | Suarez-Rivera et al. | |
| 2009/0119018 A1 | 5/2009 | Priezzhev et al. | |
| 2009/0319243 A1 | 12/2009 | Suarez-River et al. | |
| 2013/0080066 A1 | 3/2013 | Al-Dossary et al. | |
| 2013/0346040 A1 | 12/2013 | Morales German et al. | |
| 2014/0156244 A1* | 6/2014 | Cheskis | ................. G01V 11/00 703/10 |
| 2014/0379265 A1 | 12/2014 | Beda et al. | |
| 2015/0120196 A1 | 4/2015 | Li et al. | |
| 2017/0131421 A1* | 5/2017 | Shahri | ...................... G01V 1/50 |
| 2019/0391295 A1* | 12/2019 | Salman | ................ G01V 99/005 |

OTHER PUBLICATIONS

Breiman, "Random forests," Machine Learning, 2001, vol. 45, Issue 1, pp. 5-32.
Duda, et al., "Pattern Classification," 2001, 2nd Edition, John Wiley & Sons, Inc.
Gareth, et al., "An Introduction to Statistical Learning," Springer, Texts in Statistics, 2016.
Hastie, et al., "The Elements o fStatistical Learning: Data Mining, Inference, and Prediction," 2nd Edition, Springer Series in Statistics, 2016 (Front cover—p. 190).
Hastie, et al., "The Elements o fStatistical Learning: Data Mining, Inference, and Prediction," 2nd Edition, Springer Series in Statistics, 2016 (pp. 191-484).
Hastie, et al., "The Elements o fStatistical Learning: Data Mining, Inference, and Prediction," 2nd Edition, Springer Series in Statistics, 2016 (pp. 485-745).
Kullback, et al., "On Information and Sufficiency," Annals of Mathematical Statistics, 1951, 22, pp. 79-86.
Meinshausen, "Quantile Regression Forests," Journal of Machine Learning Research, 2006, 7, pp. 983-999.
Tax, et al., "Support vector domain description," Pattern Recognition Letters, 1999, 20 pp. 1191-1199.
Vapnik, "The Nature of Statistical Learning Theory," Springer, New York, 1995.
International Search Report and Written Opinion for the equivalent International patent application PCT/US2018/031295 dated Aug. 31, 2018.
Extended Search Report and Written Opinion for the counterpart European Patent Application No. 18797875.4 dated Jan. 20, 2021, 7 pages.
Communication Pursuant to Article 94(3) issued in the counterpart European Patent Application No. 18797875.4 dated May 12, 2023, 6 pages.

* cited by examiner

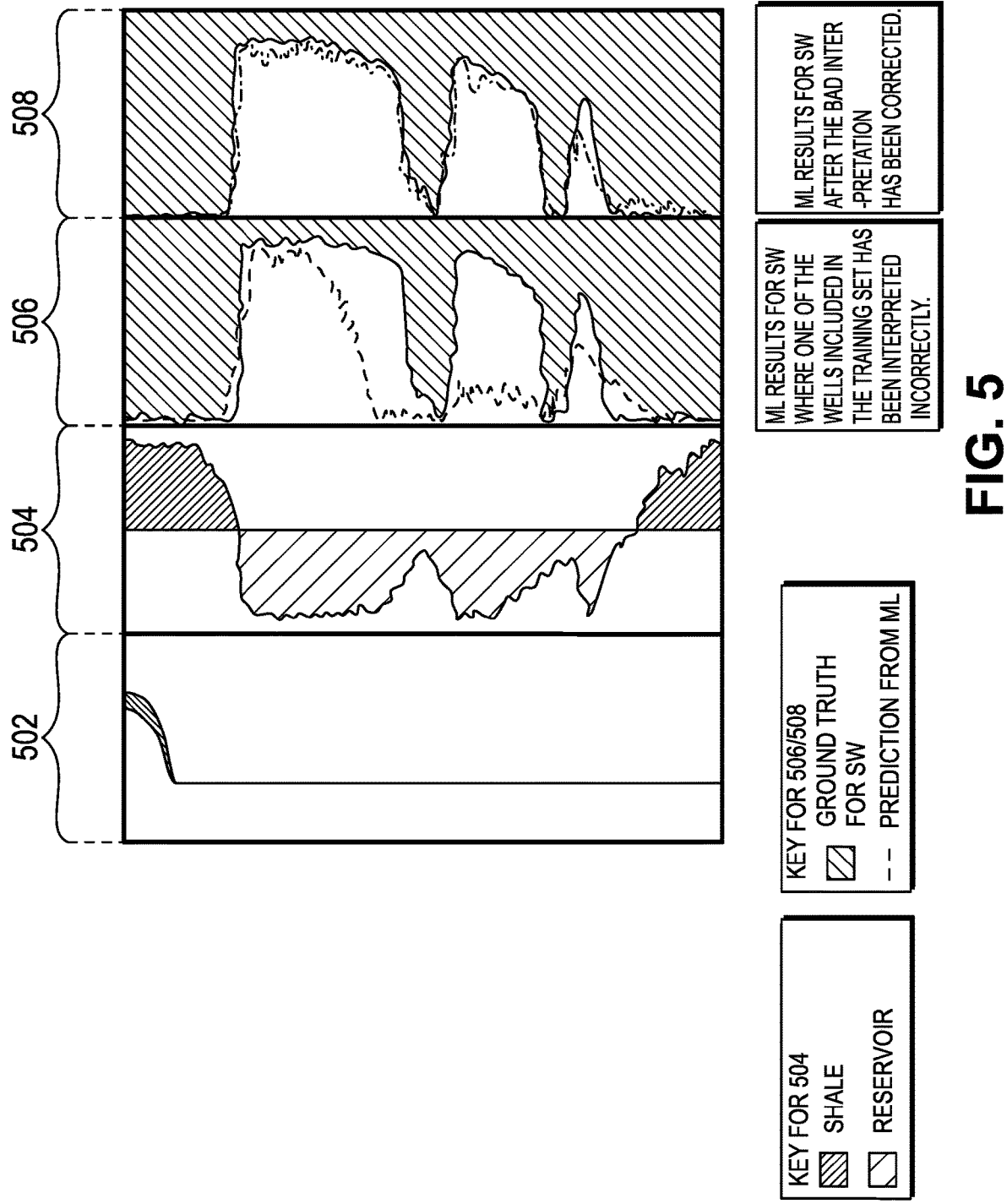

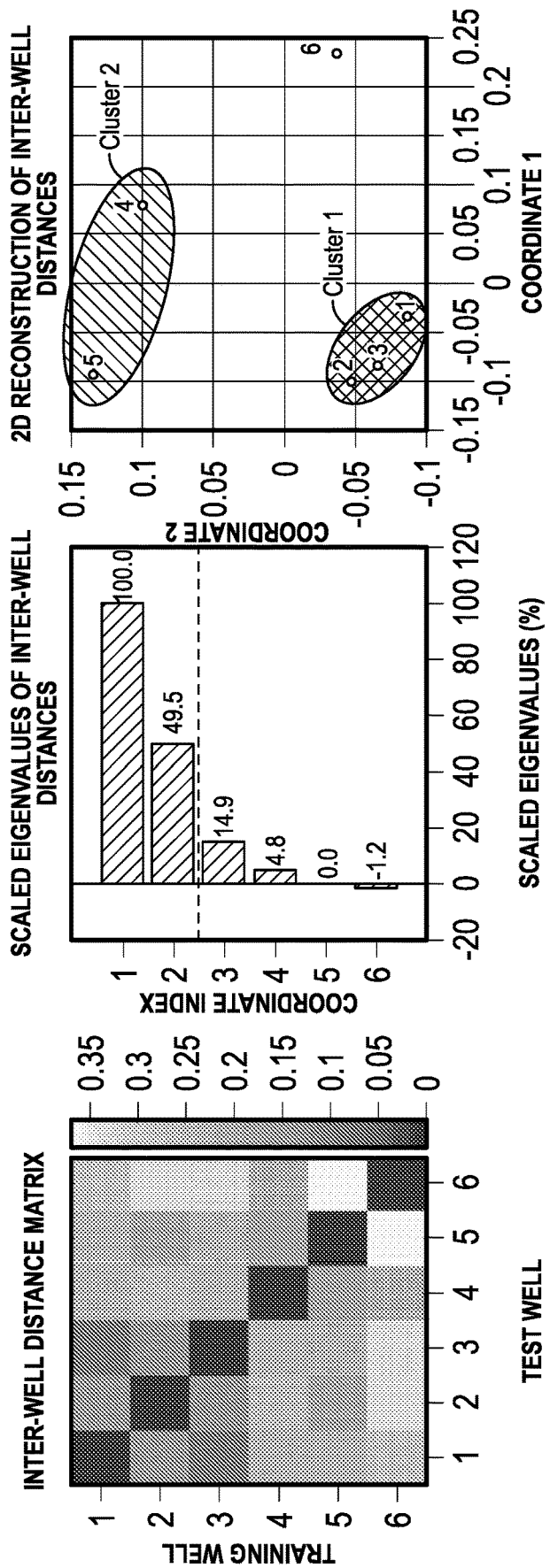

INTEGRATING GEOSCIENCE DATA TO PREDICT FORMATION PROPERTIES

CROSS-REFERENCE TO RELATED APPLICATIONS

This application claims priority to U.S. Provisional Patent Application No. 62/503,249, filed on May 8, 2017, the entirety of which is hereby incorporated by reference herein.

BACKGROUND

Mud logs and drilling data are used to determine total water saturation (Sw), total porosity (PHIT), and permeability in a subterranean formation. More particularly, a manual process is used that utilizes crossplots of data computed from drilling data and mud gas logs. Lines or segments of lines are then selected, which define "baselines" for further computation of either interim or final formation properties. The process is manual, subjective, non-repeatable, and deploys analytical formulas to obtain Sw and PHIT.

SUMMARY

A method for determining a formation property includes receiving well log data for a plurality of wells. A flag is generated based at least partially on the well log data. The wells are sorted into groups based at least partially on the well log data, the flag, or both. A model is built for each of the wells based at least partially on the well log data, the flag, and the groups.

A computing system includes a processor and a memory system. The memory system includes a non-transitory computer-readable medium storing instructions that, when executed by the processor, cause the computing system to perform operations. The operations include receiving well log data for a plurality of wells. The operations also include generating a flag based at least partially on the well log data. The operations also include sorting the wells into groups based at least partially on the well log data, the flag, or both. The operations also include building a model for each of the wells based at least partially on the well log data, the flag, and the groups. The operations also include predicting a formation property based at least partially upon the well log data and the models. The operations also include determining an uncertainty of the formation property using one or more prediction intervals from a quantile regression forest algorithm. The operations also include identifying a physical action to be performed in response to the formation property, the uncertainty of the formation property, or both.

A non-transitory computer-readable medium is also disclosed. The medium stores instructions that, when executed by a processor of a computing system, cause the computing system to perform operations. The operations include receiving well log data for a plurality of wells. The well log data is selected from the group consisting of gamma ray measurements, density measurements, neutron logs, and core data. The operations also include generating a flag based at least partially on the well log data. The flag includes an outlier flag that is generated using a one-class unsupervised support vector machine model. The one-class unsupervised support vector machine model is generated on a well-by-well basis, a global basis, or both using an outlier fraction that is user-supplied or automated. The operations also include sorting the wells into groups based at least partially on the well log data, the flag, or both. The operations also include building a model for each of the wells based at least partially on the well log data, the flag, and the groups. The operations also include adding the models to a library after the models are built. The operations also include updating the models in the library when additional ground truth becomes available. The operations also include predicting a formation property based at least partially upon the well log data and the models. The formation property is selected from the group consisting of water saturation, porosity, permeability, and compressional slowness. The operations also include determining an uncertainty of the formation property using one or more prediction intervals from a quantile regression forest algorithm. The operations also include identifying a physical action to be performed in response to the formation property, the uncertainty of the formation property, or both. The physical action is selected from the group consisting of selecting an additional well to be interpreted manually, changing a trajectory of one of the wells, and varying a property of a fluid being pumped into one of the wells.

It will be appreciated that this summary is intended merely to introduce some aspects of the present methods, systems, and media, which are more fully described and/or claimed below. Accordingly, this summary is not intended to be limiting.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures:

FIG. 5 illustrates graphs showing the impact of inaccurate interpretation in establishing the ground truth, according to an embodiment.

FIG. 11A illustrates a graph showing an inter-well distance matrix, according to an embodiment.

FIG. 11B illustrates a graph showing scaled eigenvalues of inter-well distances, according to an embodiment.

FIG. 11C illustrates a graph showing a 2D reconstruction of inter-well distances, according to an embodiment.

DETAILED DESCRIPTION

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits and networks have not been described in detail so as not to obscure aspects of the embodiments.

It will also be understood that, although the terms first, second, etc. may be used herein to describe various elements, these elements should not be limited by these terms. These terms are used to distinguish one element from another. For example, a first object could be termed a second object, and, similarly, a second object could be termed a first object, without departing from the scope of the invention. The first object and the second object are both objects, respectively, but they are not to be considered the same object.

The terminology used in the description of the invention herein is for the purpose of describing particular embodiments and is not intended to be limiting of the invention. As used in the description of the invention and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques and workflows that are in accordance with some embodiments. Some operations in the processing procedures, methods, techniques and workflows disclosed herein may be combined and/or the order of some operations may be changed.

Figure 1:
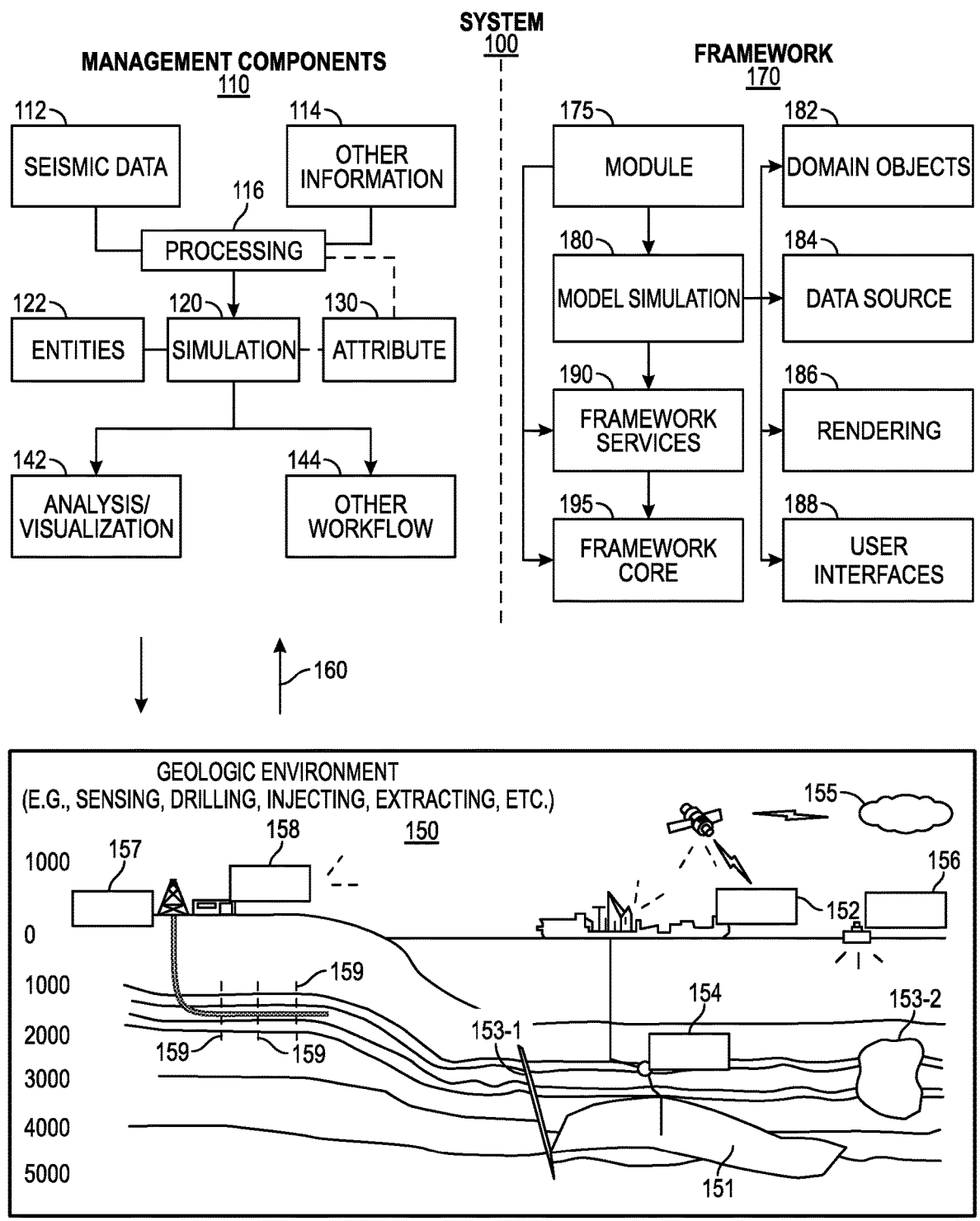
FIG. 1 illustrates an example of a system that includes various management components to manage various aspects of a geologic environment, according to an embodiment.

FIG. 1 illustrates an example of a system 100 that includes various management components 110 to manage various aspects of a geologic environment 150 (e.g., an environment that includes a sedimentary basin, a reservoir 151, one or more faults 153-1, one or more geobodies 153-2, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, bodies, reservoirs, etc. In the system 100, the entities 122 can include virtual representations of actual physical entities that are reconstructed for purposes of simulation. The entities 122 may include entities based on data acquired via sensing, observation, etc. (e.g., the seismic data 112 and other information 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. A commercially available example of an object-based framework is the MICROSOFT® .NET® framework (Redmond, Wash.), which provides a set of extensible object classes. In the .NET® framework, an object class encapsulates a module of reusable code and associated data structures. Object classes can be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE™ reservoir simulator (Schlumberger Limited, Houston Tex.), the INTERSECT™ reservoir simulator (Schlumberger Limited, Houston Tex.), etc. As an example, a simulation component, a simulator, etc. may include features to implement one or more meshless techniques (e.g., to solve one or more equations, etc.). As an example, a reservoir or reservoirs may be simulated with respect to one or more enhanced recovery techniques (e.g., consider a thermal process such as SAGD, etc.).

In an example embodiment, the management components 110 may include features of a commercially available framework such as the PETREL® seismic to simulation software framework (Schlumberger Limited, Houston, Tex.). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a commercially available framework environment marketed as the OCEAN® framework environment (Schlumberger Limited, Houston, Tex.) allows for integration of add-ons (or plug-ins) into a PETREL® framework workflow. The OCEAN® framework environment leverages .NET® tools (Microsoft Corporation, Redmond, Wash.) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the commercially available OCEAN® framework where the model simulation layer 180 is the commercially available PETREL® model-centric software package that hosts OCEAN® framework applications. In an example embodiment, the PETREL® software may be considered a data-driven application. The PETREL® software can include a framework for model building and visualization.

As an example, a framework may include features for implementing one or more mesh generation techniques. For example, a framework may include an input component for receipt of information from interpretation of seismic data, one or more attributes based at least in part on seismic data, log data, image data, etc. Such a framework may include a mesh generation component that processes input information, optionally in conjunction with other information, to generate a mesh.

In the example of FIG. 1, the model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

As an example, the domain objects 182 can include entity objects, property objects and optionally other objects. Entity objects may be used to geometrically represent wells, surfaces, bodies, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include a reservoir 151 and one or more other features such as the fault 153-1, the geobody 153-2, etc. As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or instead include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.).

The systems and methods disclosed herein may predict formation properties that are normally interpreted or measured directly, using Machine Learning (ML) Algorithms. The systems and methods disclosed herein use of Mud Gas Logs (MGL) and Drilling Data (DD), rather than Wireline (WL) or Logging-While-Drilling (LWD) logs, in the prediction of formation properties such as water saturation or total porosity. The systems and methods disclosed herein may also use of two classes of ML algorithms, called Random Forest (RF) and Support Vector Machines (SVM). RF algorithms combine multiple decision trees to yield a more accurate result with less bias and variance. RF is an ensemble method because it utilizes the output of many decision trees. SVM algorithms use a small number of data samples to capture complex decision boundaries in classification applications.

In addition to prediction with a measure of uncertainty, the systems and methods disclosed herein may use additional ideas that result in the creation of a complete automated system, which enables a non-expert to also build, select, and update ML models. The systems and methods disclosed herein use available cloud technologies for storage and quick access to massive amounts of data, the inherent HPC environment for quick number crunching of large amounts of data, and internet technologies for quick transmission of data and results. While the ideas are illustrated using well logs, the concepts are applicable to many other data types encountered in the oil industry.

Prediction of Formation Properties

The systems and methods disclosed herein use ML to predict a formation property where the ground truth does not exist. As used herein, the "ground truth" refers to information provided by direct measurement (i.e. empirical evidence) as opposed to information that is provided by inference. With reference to ML, the term "ground truth" is the standard that the ML algorithm needs to learn from. This is used in statistical models to prove or disprove hypotheses. The formation property can be one of the two types: interpreted or measured directly. An interpreted formation property is one that is computed from available direct measurements using a formula or a chart, and some a-priori information. One example is the determination of water saturation from Mud Gas Logs and Drilling Data. There is no direct measurement for water saturation, as it may be computed from triple-combo logs (e.g., density, neutron, deep resistivity), using, for example, Archie's formula, which, in addition to logs, uses a-priori information for water salinity, cementation, and saturation exponents ($R_w$, m, n). The systems and methods disclosed herein may also be used to predict formation properties that can be directly measured, by using combining data from different sources as inputs. One example would be the prediction of compressional slowness log, either from the triple-combo logs, or from the MGL+DD combination, or a mix of the two.

Assessment of Uncertainty in a Predicted Property

An ML prediction may be accompanied by uncertainty information to help guide the end-user to determine whether the answer is robust and consistent for making business decisions. The assessment may be provided automatically, with metrics that are clear and easily understood by the non-expert.

Model Building

One example includes a large data set for N wells, with logs, core, MGLs, DD, etc. for each well, covering a specific formation in this particular field. A new well is going to be drilled in the field and water saturation may be predicted from MGL+DD during the drilling of the well, prior to running WL logs. The user may determine which of the N wells should be used in the model building. The question of which wells to include in the model creation phase (also called "training") cannot be answered solely on basis of proximity, because the wrong choice of wells may result in an ML model that will make inconsistent predictions. The systems and methods disclosed herein include ML-based algorithms that aid the model building in an automated fashion.

Model Search

One example includes the case where an ML model has already been built for a specific formation/field, and appropriate data from a new well in the proximity of the field (e.g., without ground truth) becomes available and is to be used in predicting a desired formation property. The first question to be answered at this point is whether the existing model is the right one for the new well. Another example includes the more general case where a large number of models, built for specific formations in specific fields, have been catalogued in the form of a global library. Given a well from a formation and field that is not anywhere near any of the fields covered in the global library, a matching model may be identified in the library, and the model-building may be skipped, which would save time and cost. The systems and methods disclosed herein may offer an ML-based automated solution that can be used to achieve this. The case of a global library uses additional considerations, which are discussed separately.

Model Update

If ground truth for a test well becomes available at a later time, the information from this particular well may be used to update an existing model. An automated solution for this purpose is included herein.

A Global Library of ML Models

As the art is practiced in different formations/fields, the models built over time can be stored in a global library for later use. If the models are catalogued, such that a search can be executed efficiently and quickly, it can prevent the building of new models, resulting in savings of cost, time, and storage. Each model may be catalogued with attributes that carry a small foot print, so that search algorithms can run quickly.

Random-Forest Algorithms

The systems and methods disclosed herein use tree-based ensemble methods called Random Forest (RF) which are relatively new compared to other forms of machine learning techniques such as neural networks (NN). A flavor of the original RF algorithm, called Quantile Regression Forest (QRF), may be used to assess uncertainty.

Support Vector Machines

A modern classification algorithm called Support Vector Machines may be used.

High Computing Power

RF algorithms use high computing power (HPC) for industrial applications, and such platforms have recently become reliable and economically feasible, encouraging the use of tree-based decision systems.

Internet and the Cloud

Big data algorithms, as the name implies, process large amounts of data, and the cloud offers an environment where large amounts of data can be stored and accessed, economically and quickly. The Internet is also used in this setup, as models or results can be sent to the user almost simultaneously.

Automation

Automation is used to reduce human involvement/intervention to increase efficiencies and turnaround times. If a process is manual, where petrophysicists are replaced by data scientists/software engineers, then the gains are minimal. Automation may result in using fewer people. ML combined with automation allows lower levels of expertise/experience on the part of the user since the expertise is captured during the training phase and automation does not use the presence of data scientists/engineers.

Simultaneous Use of Mud Gas Logs and Drilling Data for Quantitative Interpretation Mud Gas Logs (MGL) or Drilling Data (DD), alone, may be used in the qualitative prediction of formation properties. In another embodiment, they may be used together (i.e., simultaneously) for quantitative prediction of formation properties. Quantitative here implies results that have comparable uncertainty to those obtained from traditional methods, such as wireline logs and/or core.

A Complete and Automated Workflow Implementation

High-quality predictions may be made using automated systems that are used to select training wells, match existing ML models to new test wells, and quality control the ground truth and input data.

Input Data

The inputs to the systems and methods disclosed herein are unlimited. Any type of data can be used, either from MGL, or DD, or other sources. For example, C1, C2, to C5, and their various linear and non-linear combinations (C1/C3, C1/C1+C2+C3 . . . ) may be used as inputs. Cuttings shows, or any classifiers such as sand, shale, carbonate, etc. may be added. Routine in the process is the use of GR, either from a WL or LWD/MWD run. GR can also be obtained from cuttings. Another idea is to use an LWD/MWD resistivity log, which is quite common on land wells.

Use of Other WL or LWD Logs

GR may be used, which helps in clastic environments. GR may not be used in conventional methods because their quasi-deterministic approach use formulas to relate the outputs to the inputs.

Quantitative Interpretation

The results of the methods disclosed herein are quantitative, where uncertainty is comparable to those of WL or LWD logs. Conventional results are qualitative, based on first-hand experience, and change depending on how the use picks the lines.

Uncertainty

The method disclosed herein offers a metric for uncertainty, whereas conventional methods create no such information.

Automation

The method disclosed herein is automatic, whereas conventional methods are heavily manual and subject to user experience level.

Recursive Prediction

The method disclosed herein can predict a certain property, and use it as an input in the prediction of another quantity.

Repeated Use of Models

Conventional methods pick the trend lines from scratch for each well. The characteristics of a trend picked for one well has no value for another. Each one is picked individually. The method disclosed herein is based on models, which can be used again and again, when certain criteria is satisfied, by removing the "begin-from-scratch" concept.

The systems and methods disclosed herein can be executed in real-time (e.g., while drilling a well, or logging a well), or offline (e.g., when the well has been drilled and completed, and no more operations are possible). In either case, the systems and methods disclosed herein may be offered as a cloud-based service, where the combinations of answers are computed and delivered over the Internet, very quickly, and at low cost.

The service may be fully automated, not using experts or specialists to run. In one example, water saturation may be predicted for a new well that is just being drilled, and MGL+DD+GR may be made available in near real-time (e.g., with a short delay of a few hours):

1. Knowing the location of the new well, the system may search for existing ML models that are already built. If zero exist, it then looks for candidate wells in the proximity of the new well. A candidate well is defined as one that has the appropriate input and ground data that can be used in building an ML model. If there are candidate wells, the system may automatically determine which ones can be used to build a model. If zero exist, the user is informed. Otherwise, the system starts predicting Sw, as soon as data is transmitted from the rig, and sends results immediately.
2. Searching for existing ML models (e.g., above) may be skipped if the system finds a model that is already built for the field/area, designed for the appropriate input data and property to be predicted. However, the model may not be used blindly. The system may ensure that the model to be used is consistent with the formation/field. The consistency test starts as soon as data becomes available from the new well. If consistency is found, predictions are sent to the rig. If the model is not deemed consistent, the user is informed, and the process terminates.
3. If an answer is provided in (2), an uncertainty metric is also provided to the user to aid the business decision making process. The user is urged not to depend on the ML answers if the predictions are considered to have high uncertainty.

Automated Quality Control

The systems and methods disclosed herein can be used to cross-check input data, ground truth, or interpreted results, automatically. The systems and methods disclosed herein can be used to find poorly interpreted logs (e.g., wrong choice of input parameters such as Rw, m, n), logs affected by deep invasion, washouts, whole mud invasion, in addition to bad data due to tool malfunctions or calibrations.

Availability of Invasion-Free Formation Properties

As MGL+DD are available at the time of the cutting of the formation (e.g., as soon as the drill bit churns up the rock), they represent the earliest information in the record and are free of invasion effects. These two measurements may be less affected by invasion than some of the LWD measurements, because, depending on the position of a sensor, a certain measurement may be made under some invasion conditions due to slow drilling speeds. An invasion-free measurement opens the way to a number of applications. For example, acoustic impedance computed from invasion-free logs may render superfluous doing fluid substitution, which is often the case when using WL logs. Or, acoustic impedance computed from MGL+DD can be used to validate the assumptions made in a fluid substitution application. Having a real-time invasion-free acoustic impedance log opens the door to many applications, such as real-time seismic-ties, overpressure detection, geo-steering, etc.

Better Operational Decisions

Consider the following scenarios:
1. Unexpected pay. If the prediction indicates hydrocarbons in a zone that is not known to contain hydrocarbons, additional formation evaluation runs (e.g., logs, cores, well tests) can be planned ahead of time, resulting in improved logistics and operational efficiencies.
2. No pay. If the predictions hint that the zone of interest has no indications of hydrocarbons, advanced logging runs can be added to the program (such as MDT, SWC . . . ), to ensure that the ML answers are validated. A user can also cancel the planned logging operations, if the confidence level in the ML answer is high.

Finding Laminated Pay

While the WL or LWD logs may not have the resolution to detect laminated pay, MGL+DD, in combination with cuttings shows and other non-traditional data can be used to flag zones containing hydrocarbons. Early knowledge of such a zone may then lead to the collection of additional petrophysical information (e.g., cores or MDT tests) to validate the predictions.

Automated Quick Look Answers

A prediction may be applied to WL or LWD logs (or a combination thereof) to predict petrophysical quantities such as Sw and PHIT. While trivial at first sight, this approach removes the involvement of experts for providing almost real-time answers at the well site. Consider a field where an ML model has been built, using WL or LWD logs, for Sw and other properties. In a new well, data in real-time can be sent over the Internet to obtain answers without involving petrophysicists. One can also download the ML model to a field computer before the job, and produce answers at the wellsite in real-time, without involving petrophysicists or experienced personnel.

A Solution for Missing/Bad Logs

Consider a case where one of the logs on the WL run is bad, for example, the density log. Either the problem is discovered too late to repeat the measurement, or a rerun is not considered for operational reasons. A replacement "density" log can be created in a number of ways: (i) using from MGL+DD alone from adjacent wells, (ii) using WL or LWD logs from adjacent wells, (iii) using a combination of (i) and (ii). The caveat in the third case is that invasion physics may be taken into account when combining data acquired at different times during the drilling of a well.

Answers for Wells without Open Hole Logs

Another variation is a well where there is no log data, due to well collapse, stuck pipe, instability, etc. Replacement logs can be computed from MGL+DD, as they would be acquired as soon as the bit penetrated the formation.

Answers for Wells without Open Hole Logs but with Cased Hole Logs

In the absence of Open Hole (OH logs), Cased Hole (CH) logs can be used in the evaluation of petrophysical properties, assuming that the CH logs are run after sufficient time is allowed for the dispersion of invasion effects in the flushed zone probed by the CH tools. CH interpretation may use a-priori information, such as total porosity, VShale, which are computed from OH logs. In the absence of OH logs, MGL+DD can be used to predict the inputs, further to be used in CH interpretation.

Wells with Limited LWD Sensors in the BHA

Consider a case where the LWD string includes GR+Resistivity, which is quite popular in onshore wells for cost considerations. This combination may not allow the computation of either porosity of water saturation, in the absence of porosity tools, and the systems and methods disclosed herein can be used to combine MGL+DD+Limited LWD data to compute Sw or PHIT (or other properties).

Train-While-Drilling Application

It is possible to build a specific model for a specific well, during an LWD operation, even if there is no other data available from other wells. This particular application may work in those cases where the formation is thicker than the distance between lower most and upper most LWD sensor to be used in supplying the ground truth data. Once the LWD string is sufficiently deep into the reservoir to provide the ground truth, say for Sw, the user can build a model on the fly, most likely in the surface, and start predicting Sw from MGL+DD, ahead of the LWD data. This option may be particularly attractive in horizontal/high angle wells, where the thickness vs sensor length criterion is easily satisfied.

Prediction Operation

The following equation represents an ML-based prediction process, executed by the predict algorithm, which takes two inputs:

$$Y=\text{predict}(M,X),$$

where Y is the response matrix, M is the ML model, and X is the predictor matrix. The type of the model is denoted by a subscript, for example, $M_{RF}$ represents a random-forest model.

Model Creation

The function that creates an ML model is given by the operation:

$$M_{type}=\text{createModel}(X,Y,\text{'type'})$$

Where the type can be RF, SVM or QRF; standing for Random-Forest, Support Vector Machine or Quantile Regression Forest, respectively.

Response Matrix

In general, Y is a column vector, as formation properties are predicted one at a time. Furthermore, $Y_p$ and $Y_t$ are used to distinguish a response that is predicted from ML vs. a response that is used as ground truth, respectively.

Predictor Matrix

The predictor matrix X is multidimensional. $X_{ij}$, a row of X, corresponds to the predictor vector for the depth index i. Each column, subscripted by j, represents a specific type of measurement. For example, consider a data set that has C1, C2, C3, ROP, RPM, WOB and GR measurements for each depth, and assume that the measurements are ordered as listed. Then, the first column $X_{i1}$ would represent the C1 values; the fourth column $X_{i4}$ would contain the ROP values. Rows are ordered by depth, and a higher i value indicates a deeper depth.

In addition, subscripts MGL, DD, WL, etc. are also used to identify the type of data contained in the predictor matrix. For example, $X_{MGL+DD}$ indicates that the predictor matrix has data from Mud Gas Logs and Drilling Data.

Well Specification/Domain

A superscript for X or Y indicates a specific well. For example, $Y_p^2$ represents the predicted response, for the chosen property from well 2, whereas $X_{ij}^1$ represents the predictor matrix used in the case of well 1. A superscript in capital letters indicates a domain of wells, for example, given W={1,2,3,4,5} and T={1,3,5}; $X^W$ corresponds to the predictor matrix for wells 1 to 5, whereas $X^T$ corresponds to the predictor matrix for wells 1, 3 and 5. T=W−{2,4}, using set notation.

Concatenation of Matrices

The two operators vertcat and horzcat represent the vertical or horizontal concatenation of matrices. For example, given $X^1$ and $X^2$, $$X=\text{vertcat}(X^1,X^2),$$

corresponds to the following using matrix notation:

$$X = \begin{pmatrix} X^1 \\ X^2 \end{pmatrix}.$$

Similarly, $X=\text{horzcat}(X^1, X^2)$, is equivalent to:

$$X=(X^1 X^2).$$

(1) Prediction of Formation Properties

Prediction of formation properties using ML is the main task in this section. There are three subtasks, discussed in detail:

1. Prediction of Interpreted Formation Properties,
2. Prediction of Directly Measured formation properties,
3. Prediction of Formation Properties for Quality Control.

The systems and methods disclosed herein use MGL+DD+GR, for Sw, PHIT and other properties.

Prediction of Interpreted Formation Properties

In this subtask, an already existing Random-Forest model MRF is used to predict an interpreted formation property such as Sw or PHIT:

$$Y_p=\text{predict}(M_{RF},X).$$

The application is not limited to just Sw or PHIT. A user can duplicate the process for any interpreted formation property, such as Volume of Shale (VSH), Volume of Clay (VCLY), Acoustic Impedance (AIMP), Absolute Permeability (KABS), Young's Modulus (YM), Poisson's Ratio (PR), amongst many others.

Figure 2:
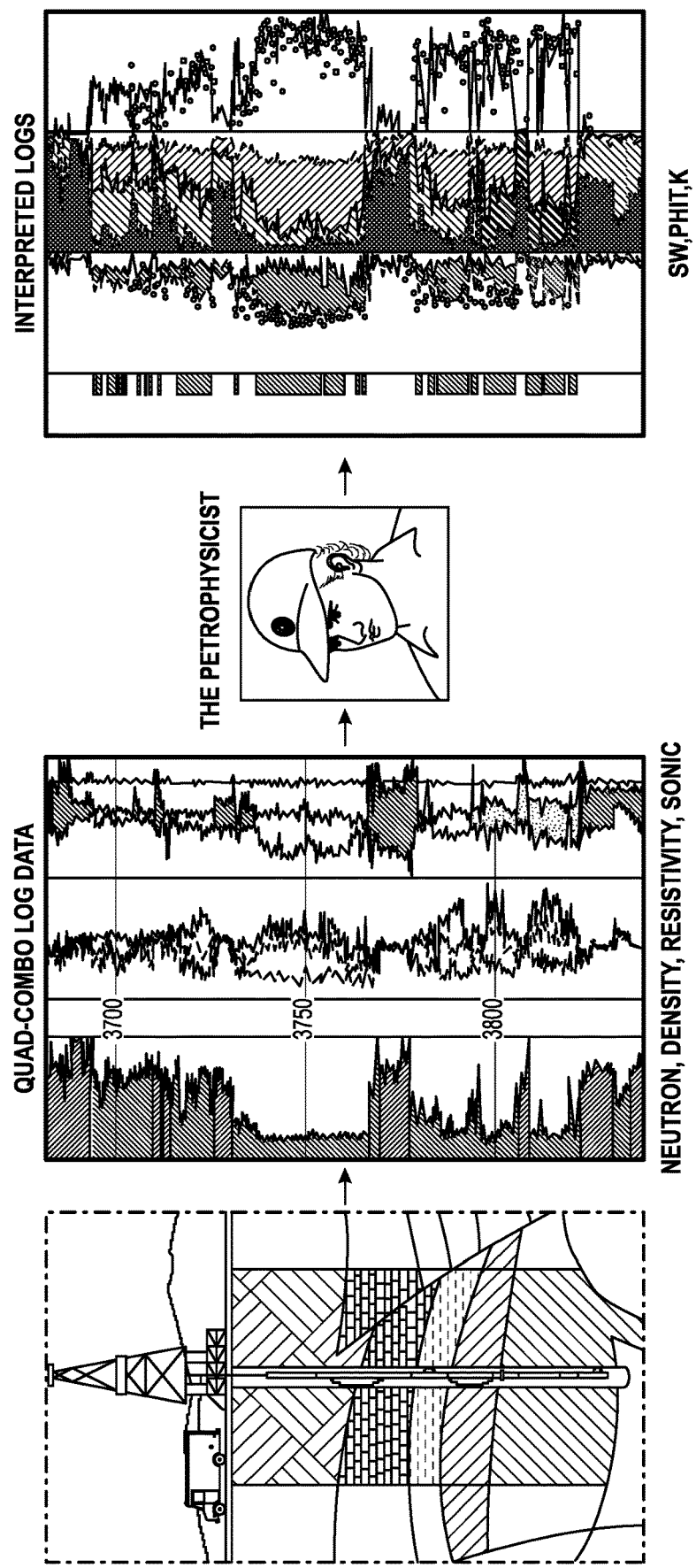
FIG. 2 illustrates a schematic view of an interpretation workflow, according to an embodiment.

An interpreted formation property (as opposed to a directly measured property) is one that is computed from WL or LWD logs (e.g., such as resistivity, neutron, density, sonic, etc.), using analytic formulas or cross-plots techniques, implemented in the form of computer algorithms. One example is using Archie's formula to calculate Sw in clean formations from WL logs. In addition to logs, the process uses a-priori information, such as formation water salinity; cementation, and saturation exponents (m,n); knowledge of lithology (e.g., quartz, calcite, kaolinite), formation temperature/pressure profiles; and fluid properties. An experienced petrophysicst executes the workflow, by picking/selecting various parameters used by the modules contained in the workflow. FIG. 2 illustrates the interpretation workflow.

In an ML model built to predict an interpreted property, the ground truth $Y_t$ used to train the model M can be wrong if the interpreter fails to properly quality control the data used to compute $Y_t$, or selects in accurate input parameters. An improperly built model may lead to inconsistent predictions. This is the reason for the emphasis and distinction on interpreted, vs. measured. The systems and methods disclosed herein offer ML-based automated workflows to ensure the consistency of the ground truth, through the use of a number of ML based automated algorithms, as outlined in the section entitled Model Building.

The systems and methods disclosed herein may use non-traditional logs, such as Mud Gas Logs (MGL) and Drilling Data (DD), with the addition of a GR log obtained from cuttings or an MWD/LWD run, to predict interpreted formation properties, that may also be determined from WL or LWD logs. Specifically, given $$Y_p=\text{predict}(M_{RF},X),$$

this translates to the following equations:

$$Y_p=S_W, \text{ or } Y_p=\emptyset_T,$$

and $$X \equiv X_{MGL+DD+GR} = \text{horzcat}(X_{MGL},X_{DD},X_{GR}).$$

The two predictor matrices $X_{MGL}$ and $X_{DD}$ are formed by the horizontal concatenation logs, where each log is represented by a column vector:

$$X_{MGL}=\text{horzcat}(C_{1norm},C_{2norm},C_{3norm},C_{4norm},C_{5norm}),$$

$$X_{DD}=\text{horzcat}(ROP,RPM,WOB,\text{flowRate}).$$

A different model is used in Sw prediction vs. PHIT, since the ground truth used in each case is different. In other words, by defining the model building as:

$$M_{RF}=\text{createModel}(X^{train},Y_t,\text{'RF'}),$$

the ground truth used differs:

$Y_t=S_w$ for water saturation modeling,
$Y_t=\emptyset_T$ for total porosity modeling, even though the predictor matrix is identical for both $(X_{MGL+DD+GR})$.

The ground truth may be obtained from a workflow built around the quantiELAN module of Techlog:

$$[Sw,PHIT]=\text{quantiELAN}(X_{WL},\text{parameters}).$$

ELAN (short for quantiELAN) is a multi-component petrophysical interpretation module that takes in logs and a set of parameters. ELAN uses careful quality control of input logs and selection of input parameters. Results from an ELAN, or any other petrophysical package, may be validated against core measurements.

Figure 3A:
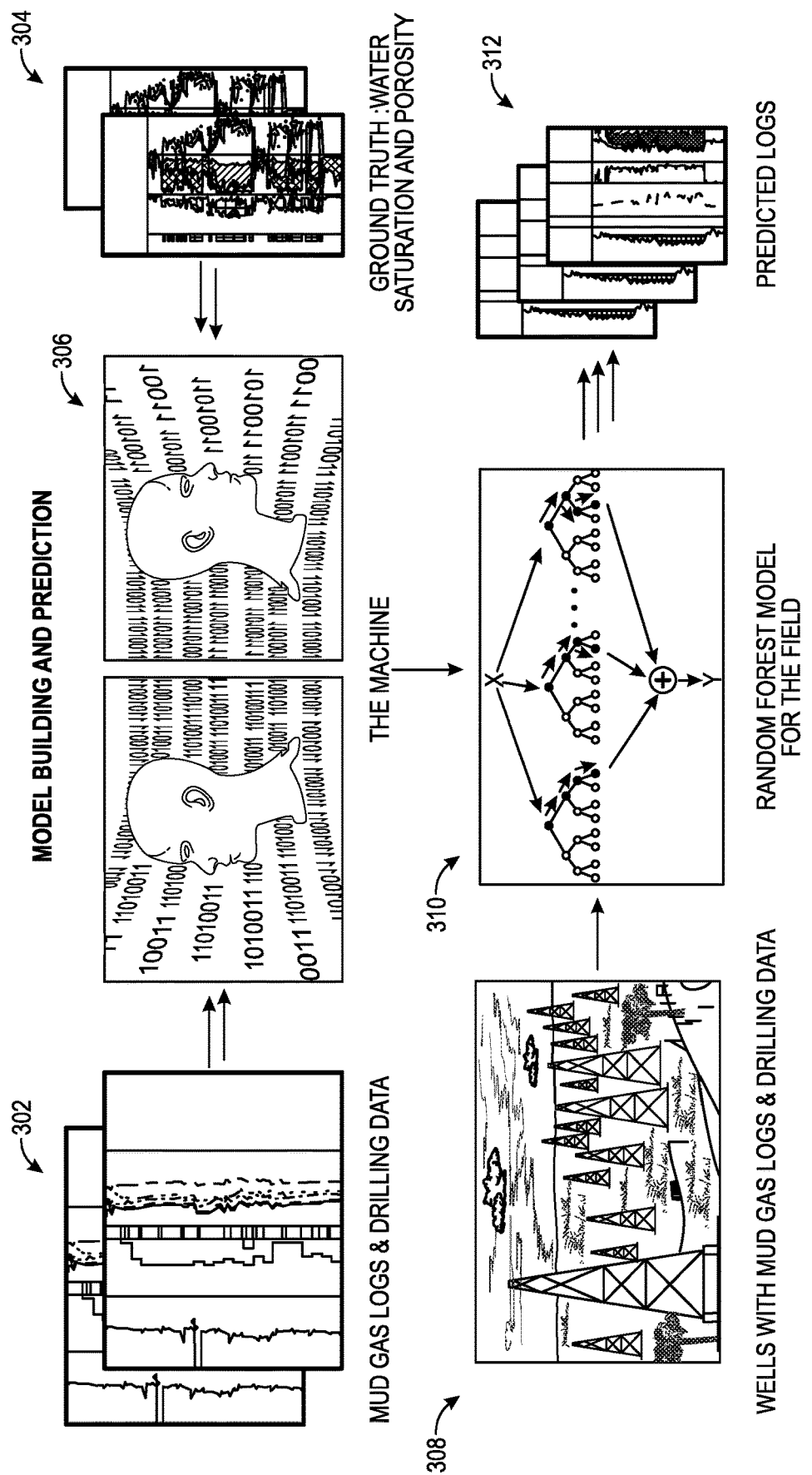
FIG. 3A illustrates a schematic view of model building and prediction, according to an embodiment.

FIG. 3A illustrates the model building and prediction. The top row is for training, and the bottom row is for prediction. In this specific example, the input data are MGL+DD+GR, and the ground truth is either Sw or PHIT.

While training, the machine learns (or the Random-Forest Algorithm, top row, middle) 306 to predict Sw or PHIT, given as the ground truth coming from ELAN (top row, right) 304 and the predictor matrix containing MGL+DD+GR (top row, left) 302. The learning is saved in the model $M_{RF}$, which is an ensemble of hundreds of decision trees (bottom row, middle) 310.

The wells used in the training or Model Building are called the training wells. A well in the training-set has the corresponding data for both the predictor and the ground truth (MGL+DD+GR, and Sw or PHIT, respectively).

Given an ML model, the user then uses it to predict the formation properties, for the test wells, as shown in the bottom row. Unlike the training-wells, test-wells do not have the ground truth. Given the ML model (bottom row, middle) 310, predictor data from any test-well (bottom row, left) 308 is fed into the model, and formation properties (Sw and PHIT in this case) are predicted (bottom row, right) 312. The model may be built once, for a given formation in a given field. The model building process may have to be built for a different field, starting from scratch, using a new set of training-wells.

Figure 3B:
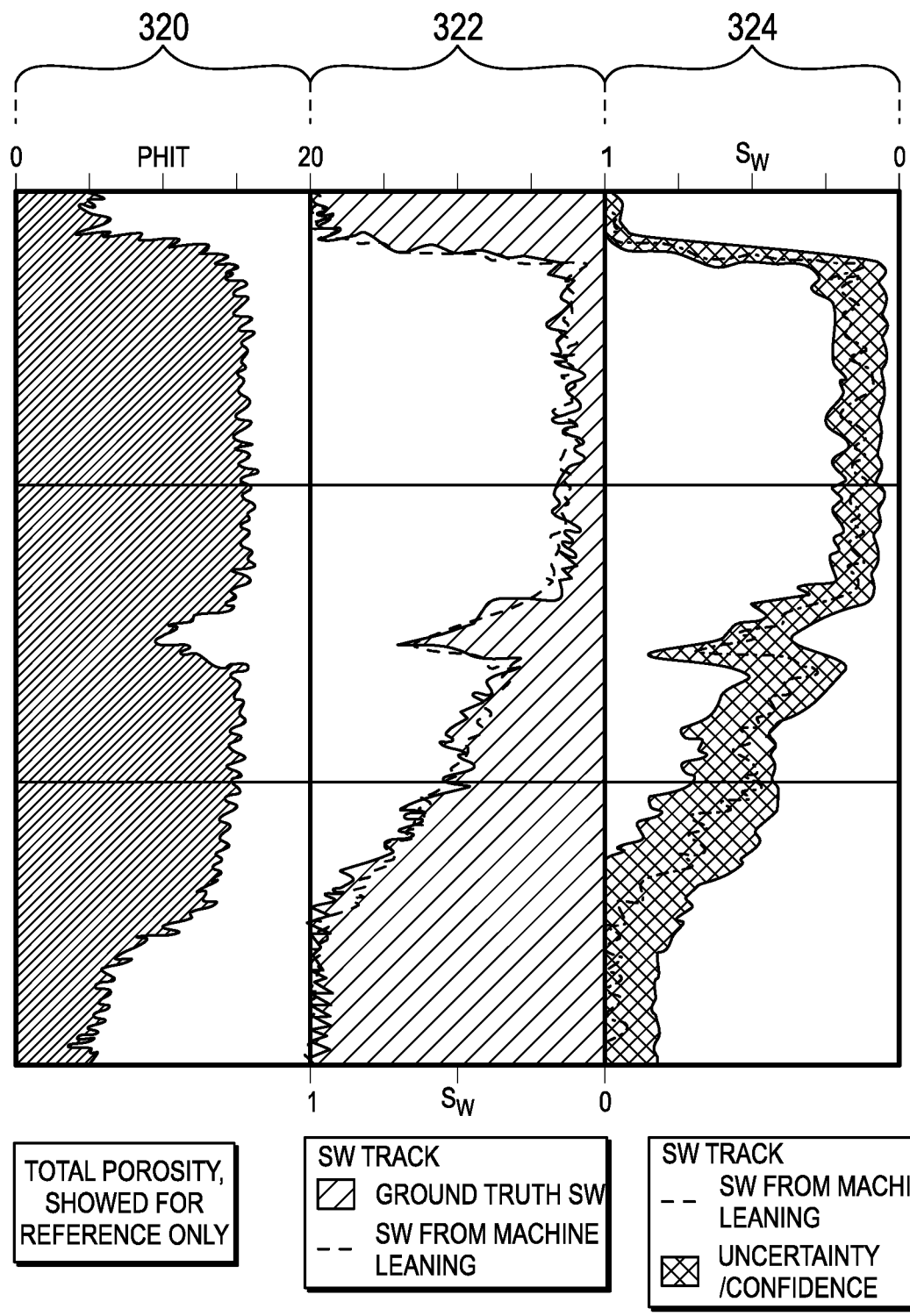
FIG. 3B illustrates graphs showing water saturation (Sw) prediction, according to an embodiment.

An example for Sw prediction is shown in FIG. 3B, which shows three tracks 320, 322, 324. Given a set of 6 wells, with MGL, DD, WL and core data, a RF model for Sw may be built from two wells, and applied to the remaining four wells. The comparison of the ground truth vs. the prediction, from one of the wells is shown in the middle track 322 of FIG. 3B. The agreement between the predicted Sw and ELAN based SW is strong, supporting the case that the predictions are quantitative and have the accuracy/precision expected from logs.

Figure 3C:
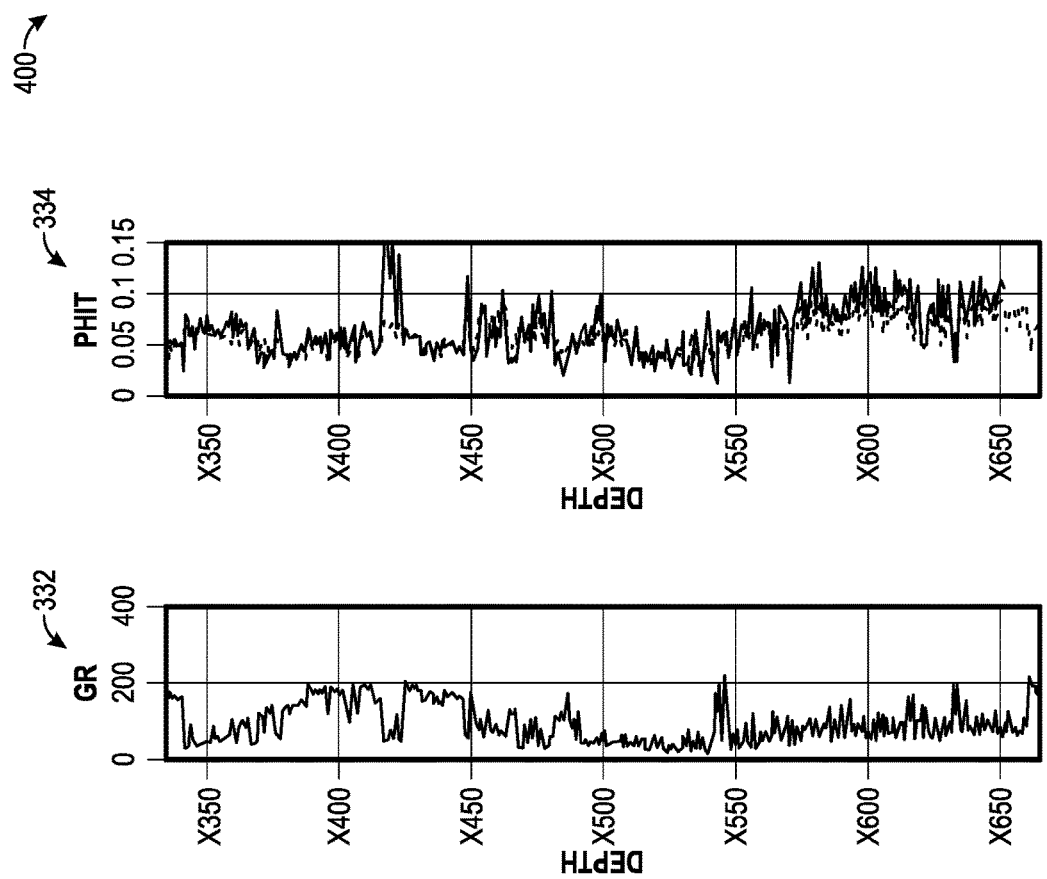
FIG. 3C illustrates graphs showing total porosity (PHIT) prediction, according to an embodiment.

FIG. 3C shows the case for PHIT. The curves in the left track 332 of FIG. 3C correspond to GR (shown for reference). The curves in the right track 334 of FIG. 3C correspond to the ground truth and predicted properties (e.g., total porosity). The Random Forest model was trained from two wells, where the ground truth was obtained from ELAN. The agreement between the two curves is strong, indicating WL quality.

Prediction of Directly Measured Formation Properties

The workflow is identical to what is described in the previous subsection and as illustrated in FIG. 3A, with the difference that the ground truth (top row, right) 304 is a specific WL or LWD log. One example is the prediction of a thermal neutron log acquired in bad-hole conditions, again from MGL+DD+GR. Since the input data (MGL+DD+GR) is acquired at the time of drilling and before borehole deterioration, it can be used to predict a thermal neutron log free of washout effects (often in the form of excessive porosity). There is no interpretation involving a petrophysicist for the ground truth in this case. The predicted quantity is a measurement that is normally acquired directly by a logging tool.

Figure 4:
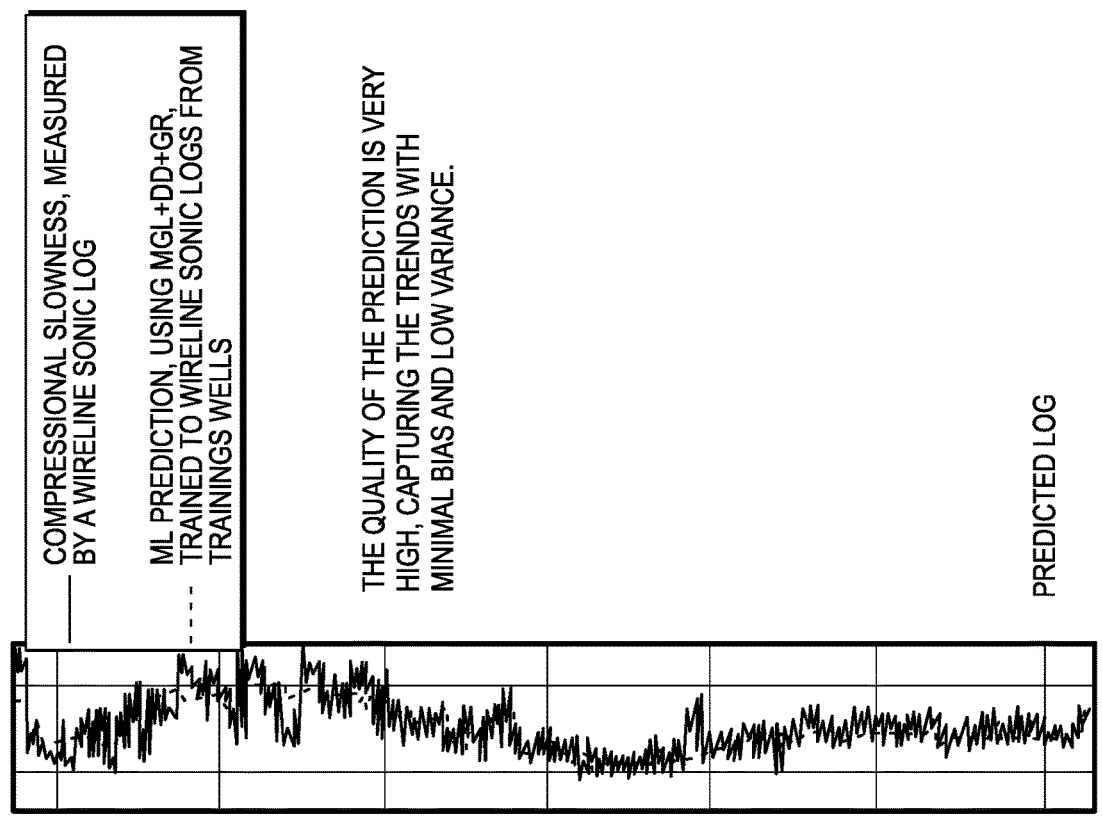
FIG. 4 illustrates a graph showing the prediction of compressional acoustic slowness, from a set of MGL+DD+GR, according to an embodiment.

FIG. 4 shows a graph 400 characterizing the prediction of compressional acoustic slowness, from a set of MGL+DD+GR. One curve is the ground truth for the test well. The other curve is the ML prediction. The predicted log mimics the ground truth quite well, with low bias and variance. In case of a bad sonic log, the ML prediction may be used for further interpretation, such as the computation of acoustic impedance for seismic-log ties. In another embodiment, the user can predict sonic logs in near real-time from MGL+DD+GR, and use it for the assessment of geomechanical properties, before WL logs are run. In the case of LWD logging, the compressional slowness may be provided by the ML process, in case an acoustic LWD log were not available.

The user may ask why this sub task is different from the previous one. The reason for separation is to emphasize the time-zero nature of MGL+DD, and exploit it in different embodiments to obtain formation properties prior to invasion. Even in the case of LWD logging, given the fact that most sensors are distanced from the bit, MGL+DD are the earliest information collected on the rocks penetrated. The differences between the curves in FIG. 4 may have other explanations. Perhaps, the differences are due to invasion, for example, gas being invaded by liquid mud filtrate. Borehole enlargement because of lack of geomechanical integrity may be another reason, since the MGL+DD would be acquired before any washouts.

Prediction of Formation Properties for Quality Control

While the quality control (QC) of directly measured or interpreted formation properties may sound trivial, doing this in an automated fashion, using ML algorithms in a cloud environment, over thousands of logs with very short turn-around-times (TAT) is very appealing and economically enticing. FIG. 5 can be used to illustrate the idea, even though it is actually intended for the Model Building. FIG. 5 includes four tracks: 502, 504, 506, 508.

The first track 502 includes caliper vs. bit size. The shading indicates washouts, which are severe in this example. The second track 504 includes GR. The shading indicates reservoir. The third track 506 includes water saturation, ground truth vs. prediction. One curve is the ground truth for Sw obtained from logs. Another curve is the prediction, from the ML algorithm. The results shown in the third track 506 were created from a training well set that included a well with bad interpretation (i.e., the porosity was calculated using inaccurate hydrocarbon properties). Because the ML model is contaminated due to the inclusion of a bad interpretation, the predictions are also inaccurate. The fourth track 508 includes the same features at the third track 506, except that the ML model has been re-trained with properly interpreted logs form the training wells. Because the machine has learned from accurate data, the resulting predicted Sw shows improvement.

The curves in the third and fourth tracks 506, 508 in FIG. 5 correspond to two Sw computations from the set same set of logs in the same well (from a set of 6 wells). Track 3 shows the ML result based on inaccurate ground truth provided by an inexperienced petrophysicist. Track 4 shows the ML result, for the same well. The ML model was based on ground truth originating from two of the original set of six wells, interpreted by an experienced petrophysicist, using accurate inputs and parameters. The difference between the two curves may be seen, and can easily be picked by an automated process.

In fact, any of the algorithms: ALG2, ALG3, ALG8, ALG9 or ALG10, can be used to identify the inaccurate interpretations, or direct measurements that are bad. The point here is the automated nature of the implementation, where guidance is given to the algorithm to clearly label the properties that are not representative.

(2) Assessment of Uncertainty in a Predicted Property

To decide whether the predictions made by the ML model are reliable enough for decision-making, the end-user may use some metric to assess the quality of the answers provided. Such metrics are referred to as measures of "uncertainty," and there are many different approaches and algorithms to produce them.

Regardless of the specific metric chosen, the information provided may be quantitative and definitive for the non-specialist for practical use. This is the way to realize the efficiency gains, as the involvement of specialists would slow down the process and increase operational costs.

The underlying concept for assessing uncertainty is that of Conditional Probability Density Function (CPDF), available from a variation of the original Random Forest Algorithm, called Quantile Regression Forest (QRF). Prediction Interval (PI), obtained from the application of QRF may be used to assess uncertainty.

Figure 6A:
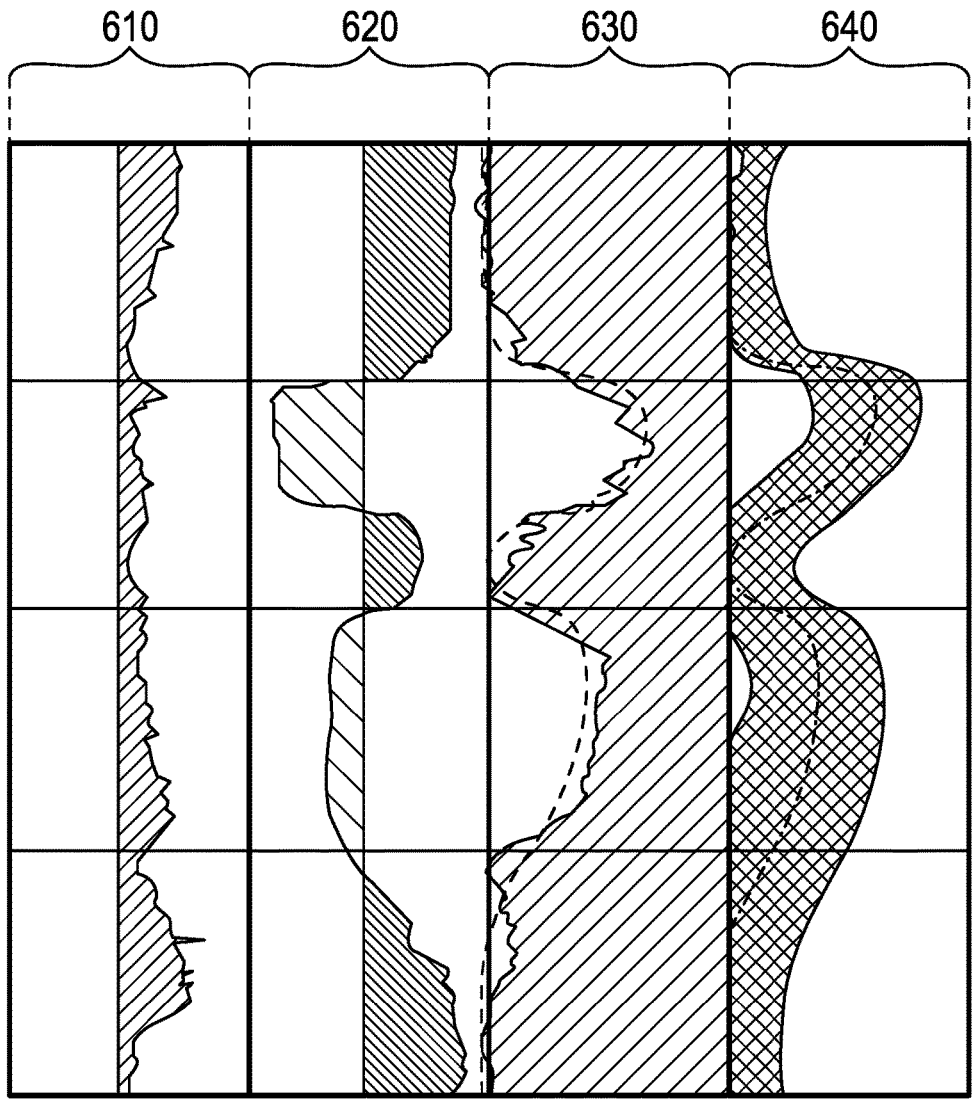
FIG. 6A illustrates graphs showing the assessment of uncertainty of a first well with higher uncertainty, according to an embodiment.
Figure 6B:
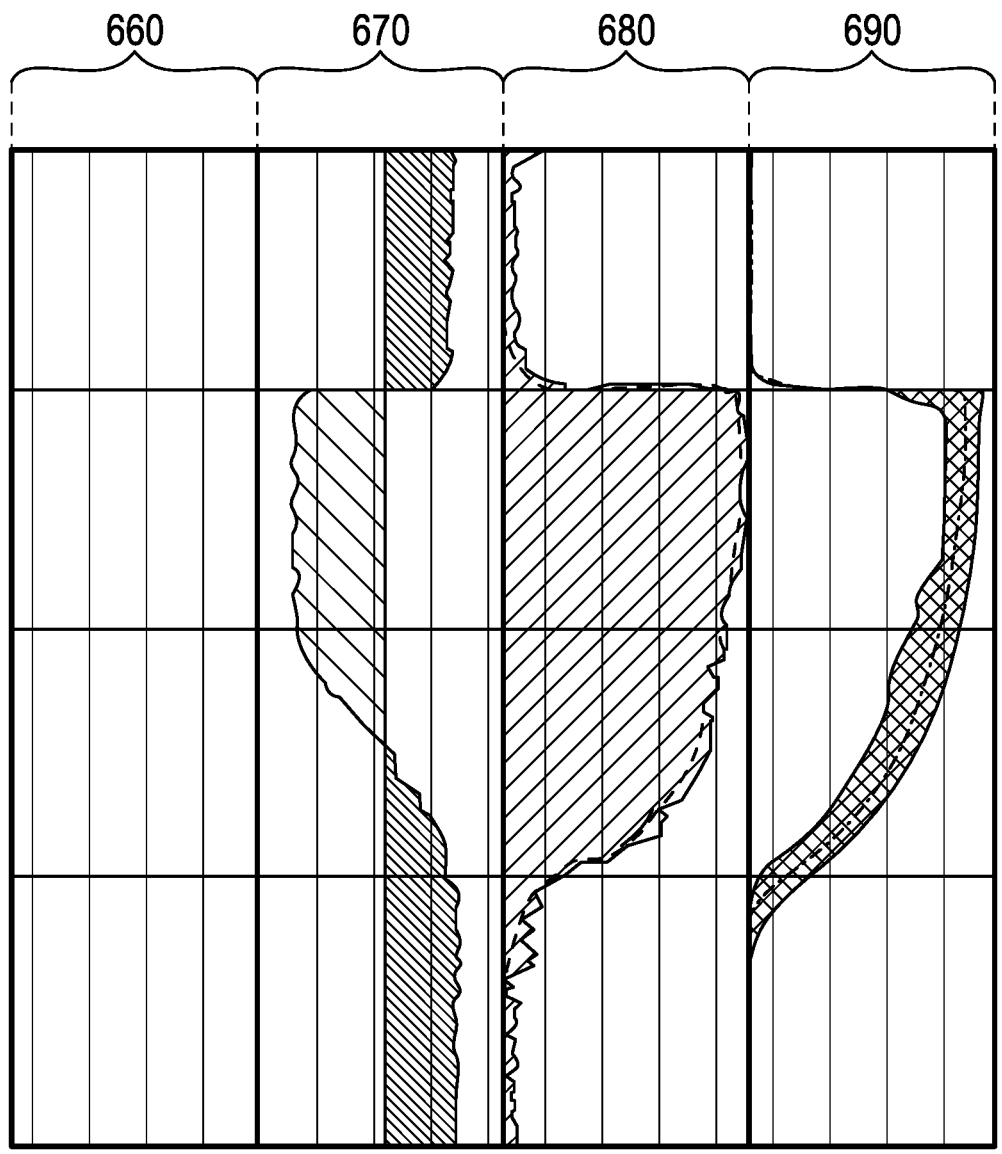
FIG. 6B illustrates graphs showing the assessment of uncertainty of a second well with lower uncertainty, according to an embodiment.

FIGS. 6A and 6B illustrate graphs showing the uncertainty, in the form of PI. FIG. 6A includes four tracks 610, 620, 630, 640, and FIG. 6B includes four tracks 660, 670, 680, 690. The first tracks 610, 660 represent caliper vs. bit size. The shading indicates washouts, which are severe in this example. The second tracks 620, 670 represent GR. Shading indicates reservoir. The third tracks 630, 680 represent water saturation and ground truth vs. prediction. One curve is the ground truth for Sw obtained from logs. Another curve is the prediction from the ML algorithm. The fourth tracks 640, 690 represent uncertainty for Sw. The curve is the same predicted Sw curve from ML. The left and right boundaries correspond to +/−25% confidence bands around the predicted value.

Two wells with different levels of uncertainty are compared. The PI for Sw in the case of well 1 is much wider than that of Well 2. The increased level is due to the washouts (e.g., enlarged borehole conditions) affecting the measurements. Comparison of the predicted Sw vs. the ground truth, shown in the third track 630, 680 for both wells, is also consistent with the uncertainty assessment: while the predicted answer in the case of well 2 closely tracks the ground truth, variations of larger magnitude are observed in the case of well 1.

(3) Model Building

A model may be built using a given a number of candidate training wells. The candidate wells have both the input data to be used in the prediction (e.g., MGL+DD+GR) and the ground truth to be used in the training (Sw, PHIT). The candidate wells may also have the WL or LWD logs that are used in the determination of the ground truth. The question to be asked at this stage revolves around the selection of the training wells, starting with a domain of wells contained in W. In other words, given: $X^W$, $Y_t^W$, where W={1, ..., N}, what is the domain S for model building, such that S⊆W? The systems and methods disclosed herein include several automated ML solutions, that can be deployed to define S, given W.

Given a group of wells clustered based on physical proximity, a well that meets any of the following conditions may be excluded from the training set:

a. The data from the well, both X and Y, despite its proximity, covers a different formation compared to the rest of the wells, b. The data used to determine the ground truth $Y_t$ is bad, c. The data in the predictor matrix X is corrupted, d. Inaccurate interpretation model or parameters have been used in the determination of $Y_t$.

Each one of these cases is discussed in more detail below, with a set of algorithms recommended as solutions. Table 1 shows a summary case-solution pairs.

Case a

The zone of interest is from a different field/formation. Given that models are most likely to be specific for a given formation in a given field, wells from different formations in different fields may not be mixed. This is due to the fact that inherent formation properties such as mineralogy (e.g., clastic vs carbonate), water salinity, hydrocarbon type (e.g., gas vs oil), formation temperature and pressure, porosity range, wettability, and others will result in log responses that are different. While proximity of the wells may appear as the most practical selection criterion, there may be others because of the possibility of differing formation properties. Algorithms ALG2, ALG8, and ALG12 can be used to determine if a well should be kept in the training set.

ALG2, called LOOWCVRF (for Leave-Out One-Well Cross-Validation Random-Forest) is analogous to the LOOCV (Leave-One-Out Cross-Validation) method used in Statistical Learning. In ALG2, in each iteration includes:

1. a well is selected for testing,

2. $M_{RF}$, an Random-Forest model is built from the wells but the well selected for testing, 3. $Y_p$ is computed using MRF from 2 above 4. An error vector is computed from $(Y_p-Y_t)$.

Figure 7B:
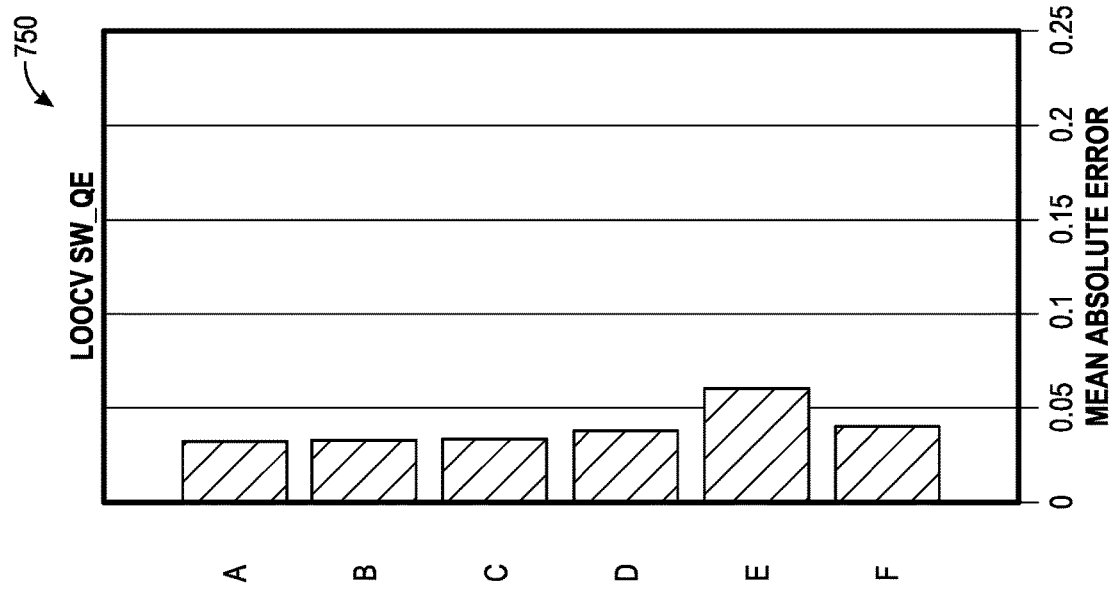
FIG. 7B illustrates a graph showing an accurate interpretation for ground truth, according to an embodiment.
Figure 7A:
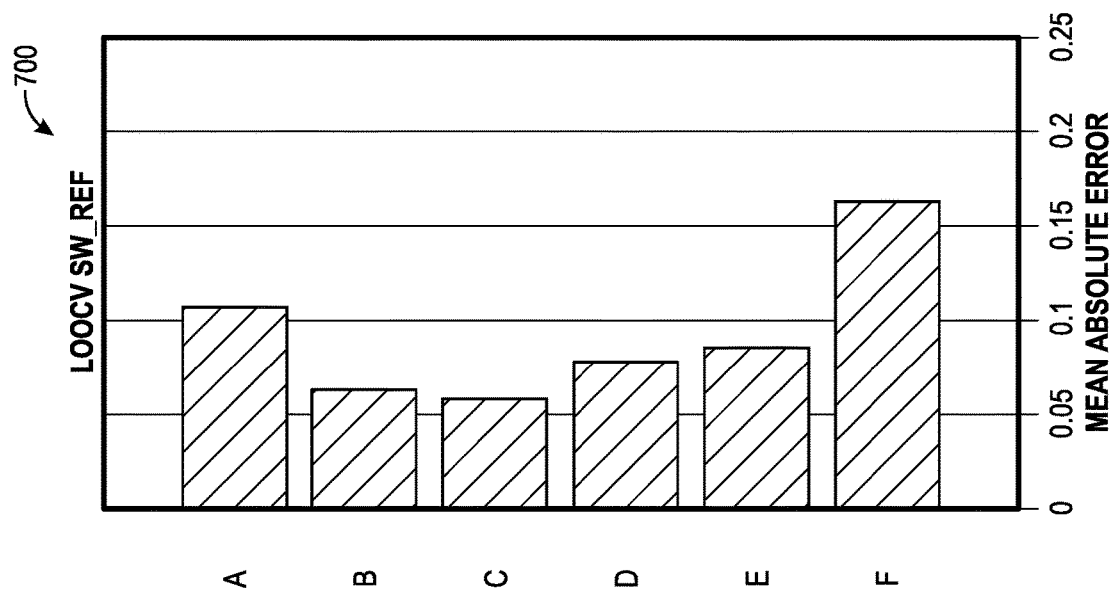
FIG. 7A illustrates a graph showing an inaccurate interpretation for ground truth, according to an embodiment.

At the end of the loop, a plot of the chosen error type vs. well number is made, and the wells with error levels above the threshold are removed from the training set. FIG. 7A is a graph 700 showing an example of an inaccurate interpretation of the ground truth for ALG2, and FIG. 7B is a graph 750 showing an example of an accurate interpretation of the ground truth for ALG2. Wells 1 and 6 have error levels above the threshold and would be kept out of the training set for building a model. ALG8, LOOWCVSVM is the SVM counterpart of ALG2.

Case b

Bad input data is used in the determination of ground truth. Consider a case of wells with quad combo data, where one has a severe washouts, or has a bad log (e.g., density) due to a tool malfunction. If formation parameters, such as Sw or PHIT, are computed from such a set of logs, the results may be inconsistent with the ground truth obtained from wells where such anomalies were not present. Furthermore, bad results included in the training set may contaminate the ML model and lead to low quality results. Several algorithms are included to deal with this problem: ALG2, ALG3, ALG4, ALG6, ALG8, ALG9 and ALG10. An example of ALG3 can be seen in FIG. 7B. The error for well 5 is higher compared to others, because the GR reading in well 5 was highly impacted by large washouts. After the identification of the problem, a borehole modification was applied to GR log, which in turn led to lower errors for Sw prediction.

Case c

Bad input data, for example, MGL from a faulty or uncalibrated sensor, may lead to the creation of an unstable ML model, since the ML algorithm will learn from bad data. Depending on the severity of the problem, either a number of variables or the entire data from that well may be excluded from the training process. The solutions offered for Case b also apply to Case c. Cases b and c are handled separately to point out where the ground truth is actually questioned in Case b.

Case d

Consider an example where quad combo logs are used in the determination of Sw. Also consider that the salinity of the formation is 30 kppm, while a petrophysicist improperly uses 300 kppm. The Sw computed in this case will be quite different from Sw computed in wells with the accurate water salinity. Hence, even if the input logs used in the determination of the ground truth are deemed of good quality, the ground truth may be validated before the well can be included in the training set. An example is shown in FIG. 5. Porosity in one of the wells included in the training set was computed inaccurately due to using wrong hydrocarbon density. This led to an inaccurate porosity calculation, which in turn impacted the calculated Sw. The inclusion of the bad well in the training resulted in an ML model that was trained on bad data, resulting in the prediction shown in the third track 506, which is completely off the ground truth. After detecting the problem using one of the approaches, the calculations were repeated with accurate input parameters. When training was repeated using the same training-wells, but with the accurate interpretation, the improved Sw for the same test well can be seen in the fourth track 508 of FIG. 5. The algorithms used for this case are ALG2 and ALG8.

TABLE 1

| | Algorithm | | | | | | | | | | | |
|---|---|---|---|---|---|---|---|---|---|---|---|---|
| Task | ALG1 | ALG2 | ALG3 | ALG4 | ALG5 | ALG6 | ALG7 | ALG8 | ALG9 | ALG10 | ALG11 | ALG12 |
| QC of interpreted Properties | | X | X | | | | | X | X | X | | |
| QC of Directly Measured Properties | | X | X | | | | | X | X | X | | |
| Model Building, Case a | | X | | | | | | X | | | | X |
| Model Building, Case b | | X | X | X | | X | | X | X | X | | |
| Model Building, Case c | | X | X | X | | X | | X | X | X | | |
| Model Building, Case d | | X | | | | | | X | | | | |
| Model Search | | | | | | | | | | | X | |
| Model Update | X | | | | | | | | | | | |

(4) Model Search

Consider the case of the initiation of an exploration campaign where the first well is being drilled. Consider further that some MGL and DD data become available, and the exploration team wants to predict Sw and PHIT, to test their play concept as well as assessing potential changes to the logging program. An ML model for the formation in this new play cannot be built in the absence of ground truth, but could one of the models stored in the global library of ML models be a match? The task described in this thought experiment, defined as Model Search, is the focus of this section.

Consider the case where a few wells have already been drilled, but ground truth has not been made available due to ongoing core work. The Model Search workflow has use even in the case of drilling programs where an ML has already been built. For example, as new wells are drilled towards the fringes of the field, where the interwell distances between the new wells vs. the original wells the model was built from increase, can a user still use the existing model to make predictions in the new wells?

Given the background that a global library of petrophysical machine learning models is available, and that the models represent varied basins, formation types (e.g., clastics, carbonates) and fluid contents, the basic idea in Model Search is to efficiently scan the global petrophysical library, and return one or more models that can be applied to the data from the new well.

One criterion for matching the new well data against the library of stored models is to minimize the amount of extrapolation that occurs when applying a model to the new well data. It is known that predictive models tend towards poor performance in extrapolation situations: those where the predictor variables for the new well fall outside the range of the training set for which the model was designed. Whereas it may seem trivial to detect extrapolation situations in the case of one or two predictors, in higher dimensions it may be difficult. Even in two dimensions, measurements which fall inside the range of each training predictor taken individually can still be outside the joint distribution of the predictors in the training set.

To address this problem, the application of the footprint computed from a one-class support vector machine may be extended as follows:
1. A library of petrophysical models is a collection of machine learning models (e.g., random forest models) trained on a number of input wells using a particular set of input log curves.
2. Associated with each library model is a footprint trained on its input data using a one-class support vector machine.
3. When a new well is available, select the same input logs from a new well and train a one-class support vector machine which defines the footprint of the new well.
4. Compute the similarity between the new well data footprint and the footprint of each model in the library using the Jaccard (e.g., sample wise intersection over union) or other similarity metrics.
5. Return the model which provides the best match, or a list of models ranked by the strength of the match with the new well.
6. Apply the best matching model to make predictions for the new well ALG11, named RankModels, is designed to aid the Model Search process by returning a ranked index of models from a global ML model library.

(5) Model Update

One decision point arrives in the lifecycle of an ML model when the ground truth from a well becomes available. Consider that a model M, built for a domain of wells W, already exists and has been used to make predictions for well {n} which at the time did not have the ground truth. In other words, starting with:

$X^W, Y^W, M_{RF}$, where $W=\{1, \ldots, N\}$, $X^n, Y_p^n$, where $n \cap W = \emptyset$, should the existing model for this formation/field be updated by adding well n into W, once $Y_t^n$ becomes available?

Another associated question is whether the predictions made for other wells in the field—which do not have ground truth—should be replaced with a new set of predictions made using the updated model? The decision to replace can have serious consequences, for the effort and time that it would take, in addition to the possible changes in reserve estimates if the predicted properties were used in building static or dynamic models.

Assuming that $Y_p^n \approx Y_t^n$:
1. Obtain the base-case error vector, if it is not readily available in the global model library:

$e_{basecase} = \text{ComputePredictionError}(X^W, Y_t^W, X^W, Y_t^W)$.

2. Create a new well domain by adding well n into W: V=union(W, n).
3. Obtain the new error vector corresponding to the updated model:

$e_{new} = \text{ComputePredictionError}(X^V, Y_t^V, X^W, Y_t^W)$.

4. Given the error difference vector $\Delta_e = e_{basecase} - e_{new}$, if $\Delta_e > 0$ and $|\Delta_e| \leq \varepsilon_{min}$, then update model and repeat predictions for wells without ground truth.

An error threshold is used to decide if the model should be updated, to prevent updates originating from numerically minor values of $\Delta_e$. Some threshold values for Sw and PHIT are 0.05 and 0.005, respectively.

(6) Building a Global Library of ML Models

The idea of building a global library is straightforward and appealing. As the art is practiced in different formations/fields, the models are stored in a global library, which one day may have an already built ML model for a majority of cases to be encountered.

While the concept of building a library part is trivial, it is populated with already computed components to enable an automated and efficient search workflow that can scan through hundreds of models quickly. The mechanism for the search task has already been discussed in the Model Search Section, through the use of ALG11. What remains is the definition of the data/model components to be stored in the library for an efficient search, in addition to the triplets of $\{X, Y, M_{RF}\}$ for each model. Given that ALG11 uses the one-class SVM algorithm, storing each $M_{SVM}$ completes the solution. Hence, each member of the library has the following data/model components and parameters:

$\{X, Y, M_{RF}, M_{SVM}, \text{outLierFraction}\}$.

The systems and methods disclosed herein use Random-Forest techniques. In other embodiments, similar applications may be built using other ML algorithms such as SVM (Support Vector Machines), Deep Learning (an advanced version of Neural Networks), GL (Genetic Algorithms), amongst some others. The systems and methods disclosed herein use Mud Gas Logs (C1 to C5), Drilling Data (ROP, RPM, WOB and Flow Rate), and basic logs such as GR. Other data types may also be used, such as Mud Weight, Mud composition, wellsite geology answers (e.g., cuttings descriptions, shows), new types of mud logs (C6, C7, C8, $N_2O$ $C_2O$, $H_2O$ . . . ) and drilling data (e.g., torque, vibration, etc.). In one embodiment, a limited suit of LWD measurements may be added. For example, a user can combine MGL+DD with LWD, GR, Resistivity, and Density. There are similar combinations like this for LWD and WL.

The systems and methods disclosed herein may use measurements made at the surface. In other embodiments, drilling measurements made at the bit may be used (e.g., using a downhole tool/sensor). It is also possible to use a downhole sensor to duplicate the mud log measurement (e.g., to obtain the measurement downhole, rather than at the surface). Hence, a mud log measurement made downhole can be used as a differentiator. In another embodiment, the prediction may be done downhole (e.g., the measurements and the ML prediction part). The user can load the ML model to an LWD tool, process the data from mud-log and drilling sensors in real-time, downhole, and send the predicted quantities uphole using mud telemetry. Although the methods have focused on Sw, PHIT, and some direct measurements other properties, such as anisotropy, stress, maturity, flow rates, relative perm, acoustic impedance, wettability, etc. may also be used.

The Random Forest Algorithm

Random forest is a machine learning algorithm that has been successfully applied to a variety of classification and regression problems. The idea of random forests is to construct a large number of regression trees from bootstrap samples of the training data. For each tree and each node, a random selection is made when choosing which variable to split on. In addition, a random subset of the predictors is considered as candidates for splitting at each node. The size of the random subset is one of the few tuning parameters of the algorithm, and the minimum number of samples in each node of the tree is another. Random forests perform well without extensive tuning of these parameters.

Taken on their own, each tree is a noisy but unbiased predictor of the response. In regression, a prediction from a random forest model is the average response across the trees. Averaging the predicted response across the trees in a random forest reduces the variance of the predictions and provides a model that can capture complex relationships between the predictors and the response.

For each tree:
1.1 Draw a bootstrap sample from the training data
1.2 Grow a decision tree from the bootstrap sample by recursively repeating the following for each child node until the minimum node size is reached:
1.2.1 Select at random the candidate variables for splitting out of the predictors.
1.2.2 Select the best variable and split point
1.2.3 Split the current node into two child nodes
2. Output a random forest model which comprises an ensemble of trees.
3. To make a regression prediction at a new point, take the arithmetic average of the response of each tree in the random forest.

The following equation summarizes the process described by 1 and 2 above:

$$M_{RF}=\text{createModel}(X, Y_t, \text{'RF'}),$$

where subscript t in $Y_t$ highlights that the response matrix corresponds to the ground-truth.

Given a model $M_{RF}$, and data predictor matrix from the nth well, prediction of the desired formation property is given below (as described in 3 above):

$$Y_p^n=\text{predict}(M_{RF}, X^n).$$

Both Y and X contain the same types of variables, in the model building and prediction portions.

Assessment of Uncertainty in Random-Forest Regression

Applied to regression problems, a random forest based model can provide a good approximation to the conditional mean of the response variable from a number of input predictor variables. However, on its own, the conditional mean does not provide any assessment of the uncertainty associated with the prediction or any information about how the response variable might be expected to fluctuate around the conditional mean prediction. The Quantile Regression Forest (QRF) offers a solution.

QRF has shown that a random forest model can be used to go beyond prediction of the conditional mean by providing more complete information about the conditional distribution of the response variable. The full conditional distribution of the response variable represents a description of the uncertainty on the response variable given the predictor variables and provides information on how the expected variability of the response variable given the measured values of the predictor variables.

The conditional distribution can be described in terms of the conditional probability density function (CPDF) or its integral, the conditional cumulative distribution function (CCDF). The conditional mean is just the first moment of the CPDF. The second moment or conditional variance may be taken as a measure of the uncertainty on the response variable but is not a useful description of uncertainty when the shape of the CPDF is not Gaussian. Quantile regression techniques have been developed to address this problem by capturing the conditional distribution in a general way, without any assumptions on its shape.

The idea of quantile regression is to estimate the conditional quantiles of the distribution, and quantile regression can be performed in the context of random forests. The idea is that whereas random forests store the mean of the observations that fall in each node of each tree, quantile regression forests store the values of each of the observations that fall in each node of each tree. Storing this extra information enables the estimation of features of the conditional distribution, such as conditional quantiles, and thereby goes beyond prediction of the conditional mean alone to a full non-parametric estimation of the conditional distribution.

Conditional Distribution

Quantile regression forests address the problem of uncertainty assessment by estimating conditional quantiles. To describe the full conditional distribution, the systems and methods disclosed herein use a discretized approach by specifying a number of quantiles equally distributed across the range of probabilities between 0 to 100%. For each new prediction of the response variable, the conditional quantiles are computed from the quantile regression forest resulting in a discretized CCDF where regularly sampled probability values map to their corresponding irregularly sampled quantile values. Assuming a fine enough discretization, linear interpolation enables the rapid calculation of the CCDF at any value of the response variable. For display purposes, it may be useful to resample the CCDF on to a regular grid of response values so that multiple CCDFs, each sharing the same sampling of response values and corresponding to predictions made at different measured depths in a well, can be displayed as an image in a well log display. Such a display enables the petrophysicist to visualize the variations in the character of response variable conditional distribution along the well track. A discretized CPDF can be easily computed from the CCDF by differencing.

The discretized CPDF can be used to quantify the reduction in uncertainty that occurs when predicting the response. By way of illustration, consider the case of predicting water saturation—before the predictor measurements are accounted for, our knowledge of the water saturation may be represented by a uniform distribution between 0% and 100% saturation. This uniform prior distribution expresses complete lack of knowledge of the true value of saturation since the values have equal probability. After accounting for our predictor measurements, the conditional distribution from the quantile regression forest represents the posterior distribution of water saturation. The change between the prior and posterior distribution can be summarized using a concept from information theory called Kullback-Leibler divergence, also called the information gain or relative entropy, which provides a measure of the distance between the uniform prior distribution and the posterior. Using this approach to an uncertainty assessment may lead to results can be easily displayed in a standard well log display as a single log curve.

Prediction Intervals

Quantile regression forests can also be used to compute prediction intervals that address the question of how reliable is a new prediction of the response variable. Prediction intervals are closely related to the conditional distribution, for example, a 95% prediction interval is the interval between the 2.5% and 97.5% quantiles of the conditional distribution and defines an interval which should contain the response with high probability. The width of the prediction interval may vary considerably as a function of the values of the predictor variables. Wider prediction intervals indicate increase uncertainty on the response. The definition of the prediction interval can be made by the user, another common choice is the 50% prediction between the 25% and 75% quartiles which is called the inter-quartile range (IQR).

The prediction interval approach may improve the uncertainty assessment because the results can be easily displayed in a standard well log display as an interval between two curves defining the upper and lower quantiles. The width of the prediction interval can also be displayed as a single log curve that is simple summary of the uncertainty of the prediction since wider (narrower) prediction intervals correspond to more (less) uncertain predictions. In contrast, the full conditional distribution is more difficult to display and also perhaps more difficult for the petrophysicist to interpret.

Uncertainty Assessment Algorithm

A sample algorithm for the computation of variables used in uncertainty assessment is given below in pseudo-code:
1. The user selects a well on which to predict the response variable of interest.
2. A pre-existing Quantile Regression Forest (QRF) model is selected from a library or a new QRF model is created from a training dataset.
3. A regularly sampled vector of probability values (between 0 and 100%) is defined to provide the basis for calculating the discretized conditional distribution. There is a reasonable default, for example intervals of 5% between 0% and 100%.
4. The user defines the prediction interval of interest by selecting the upper and lower quantiles. For example, the 2.5% and 97.5% quantiles define the 95% prediction interval.
5. For each measured depth sample in the well of interest:
   5.1. predict the quantiles for the discretized CCDF using the QRF model
   5.2. interpolate the discretized CCDF to a regular sampling of the response variable
   5.3. compute the CPDF by differencing the CCDF derived above
   5.4. compute the Information Gain, a measure of the distance between the CPDF and a reference uniform prior distribution
6. For each measured depth sample in the well of interest:
   6.1. predict the quantiles for the prediction interval using the QRF model
   6.2. compute the prediction interval width
7. Display the CPDF and CCDF as an image in a log track display
8. Display the Information Gain as a log curve in a log track display
9. Display the prediction interval and the prediction interval width as log curves in a log track display Petrophysical Novelty Detection The process of petrophysical novelty detection includes two parts: (a) the description of a high-dimensional training set of well logs representing the normal or expected range of measurements and (b) the detection of anomalous measurements that are unexpected or novel with respect to the training set. The measurements may be due to valid measurements of formation properties that are not represented in the training set, or they may be caused by errors due to tool failures or bad hole conditions. Conversely, the absence of detections when testing measurements from a new well indicates that the measurements are consistent with formation properties already known.

One-Class Support Vector Machine

A classification algorithm called the Support Vector Machine (SVM) may be used where the idea of the algorithm is to choose a small number of the training data samples (these are the so-called support vectors) to define a decision boundary which governs the classification process. SVMs have proven to be popular due to their flexibility in capturing complex decision boundaries. An extension to SVMs may allow the user to trace the boundary of a training data set, a problem they call domain description. In this approach, the training data is treated as belonging to a single class, in contrast to normal classification problems where there may be several classes. Therefore, it is known as a one-class support vector machine.

The parameters that control the algorithm are:
1. The outlier fraction, a small percentage (e.g., 5%) of the training samples can be treated as outside the decision boundary. This parameter may be used to create a decision boundary that is tight around the remaining bulk of the training set.
2. A parameter that controls the number of support vectors and hence the amount of detail in the decision boundary. This parameter may be used when the data distribution is not a simple cloud that can be modelled as a spheroid or ellipsoid but has a complex branches.

The outlier fraction is a parameter in training the one-class SVM model for outlier detection. An automated procedure is used to pick the value of this parameter, as follows:
1. Select logs from one or more input wells;
2. Train a one-class support vector machine using a value of zero the outlier fraction;
3. Output trained model which defines the normal data footprint at zero percent outliers;
4. Test the entire training set against the footprint, compute the SVM score at each data point;
5. Compute the empirical cumulative distribution function of the SVM score at each data point;
6. Define a regular sampling of cumulative probability between 0 and 100% (e.g., 1%);
7. Resample the empirical cumulative distribution function of SVM scores to the regular sampling of cumulative probability defined in 6;
8. Compute the $2^{nd}$ derivative of the resampled empirical cumulative distribution defined in 7;
9. Identify largest peak in the $2^{nd}$ derivative subject to user specified limits on cumulative probability; and
10. Output the cumulative probability of the picked peak and the associated SVM score. The output cumulative probability is the value for the outlier fraction parameter.

Figure 8A:
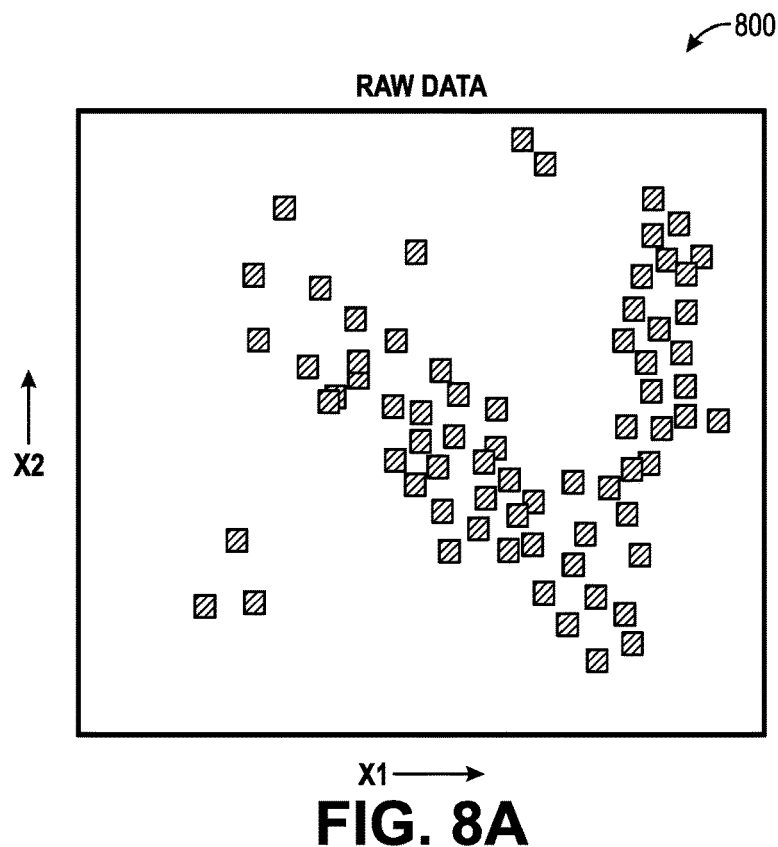
FIG. 8A illustrates a graph showing petrophysical detection using raw data, according to an embodiment.
Figure 8B:
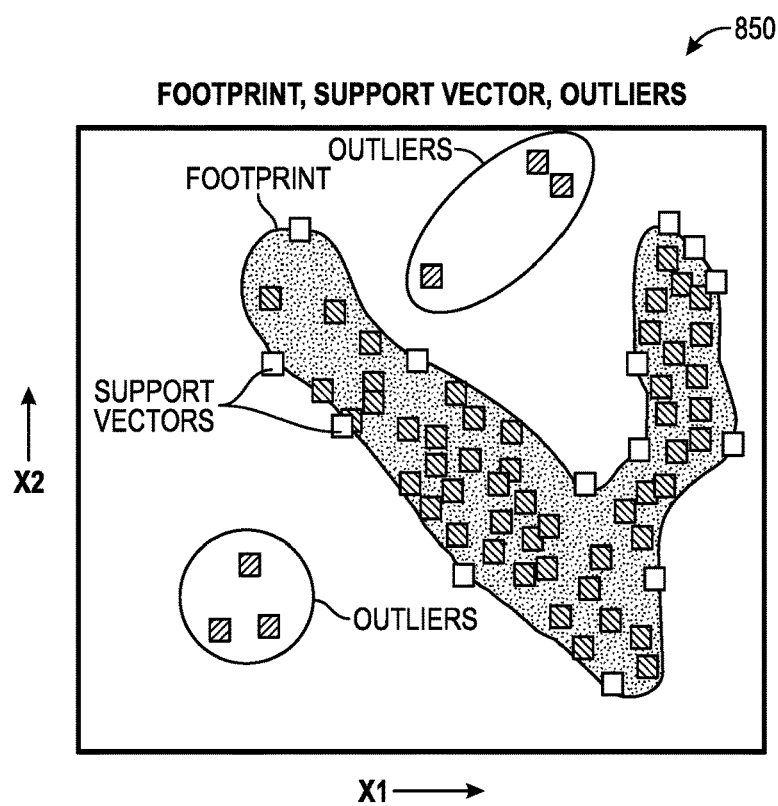
FIG. 8B illustrates a graph showing petrophysical detection using footprints, support vectors, and outliers, according to an embodiment.

The term footprint is used to describe the decision boundary computed from a one-class support vector machine. In practice, a well may have multiple footprints if partitioning the logs into related groups MDL, DD, WL etc. A well can also have multiple footprints formed by splitting its logs by zone, facies or fluids. FIGS. 8A and 8B illustrate footprints 800, 850 computed for a single well using a one-class support vector machine on a dataset including two logs, X1 and X2. The raw log measurements are plotted in FIG. 8A and the footprint that describes the boundary of the data, is shown in FIG. 8B as the filled region. The footprint is defined by a small number of the raw data samples shown as open symbols that are called the support vectors since they effectively hold the boundary in place. This particular footprint identifies a small fraction of the data samples as outlier points. The outlier fraction is an input parameter to the algorithm that controls the position of the footprint.

Quality Control of Logs

This suggests the following workflow for log quality control with a statically trained footprint, also summarized in ALG6:
1. Select logs from one or more input wells;
2. Train a one-class support vector machine
3. Output trained model which defines the normal data footprint
4. Test the entire training set against the footprint, label each sample as normal or outlier
5. Plot the training footprint labels in a log track display
6. For new test wells with the same logs available, label each sample as normal or outlier according to the previously trained footprint
7. Plot the test footprint labels in a log track display The workflow above may be extended such that the number of input wells varies or the process is applied iteratively. The main options are:
(a) Global. The wells in a project are selected in 1 above, and the label results are a global quality control where the data from each well is tested against the footprint derived from each of the wells.
(b) Well-by-well. The process is performed on a well-by-well basis with each well selected in turn in 1 above. The label results are a well-by-well quality control where the data from each well is tested against the footprint derived from the same well.
(c) Iterative (or Combined). The global approach described in (a) is applied and any data labelled as outlier data is excluded from the original input to form a cleaned training dataset. The cleaned training dataset is then input to the well-by-well approach described in (b) where further outliers are detected by testing the data from each well against the footprint derived from clean training data for the same well.

Petrophysical Similarity Analysis

The idea of the footprints computed from one-class support vector machines can be extended to analyzing the log data from multiple wells and identifying which wells are similar based on their log measurements. The ability to automate this process may be used for data quality control and selecting which wells to include in a machine learning training data set.

Figure 9C:
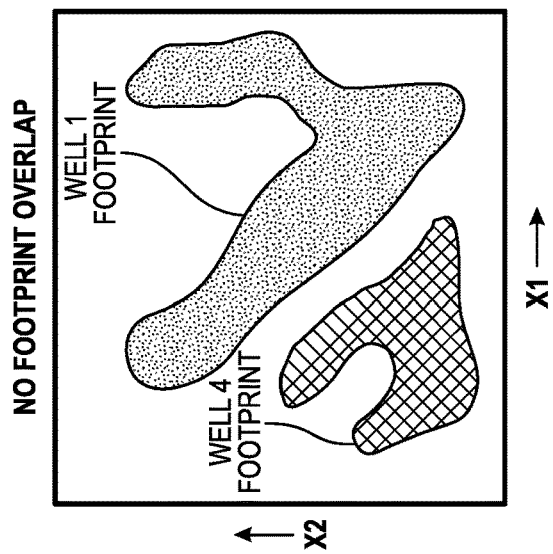
FIG. 9C illustrates a graph showing no footprint overlap, according to an embodiment.
Figure 9B:
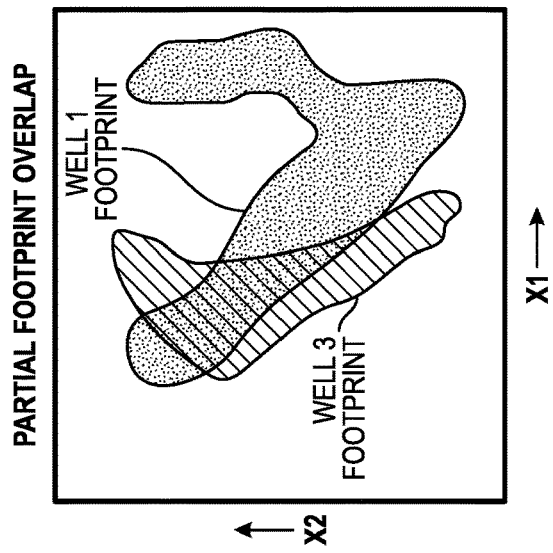
FIG. 9B illustrates a graph showing a partial footprint overlap, according to an embodiment.
Figure 9A:
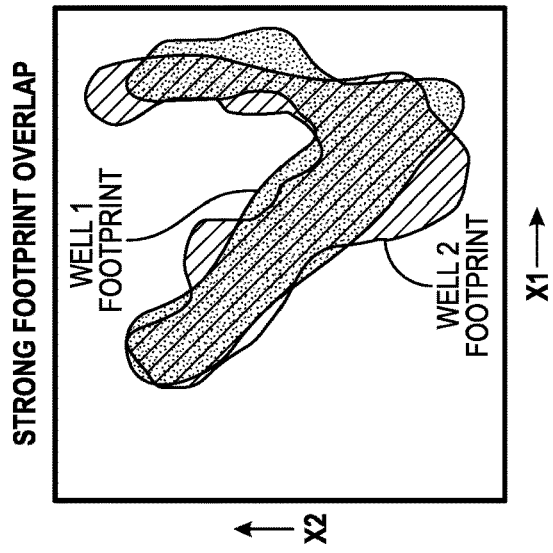
FIG. 9A illustrates a graph showing a strong footprint overlap, according to an embodiment.

Given a large number of wells, the footprint can be calculated by well using the same set of log curves. In general, the amount of (multi-dimensional) overlap between two footprints is a measure of similarity between two wells. FIGS. 9A, 9B, and 9C illustrate the concept of comparing the amount of overlap between pairs of well footprints as a means to identify similar or dissimilar wells. FIG. 9A shows that the footprints of wells 1 and 2 are very similar and almost completely overlap with some small mismatch; FIG. 9B includes a comparison of wells 1 and 3 showing a degradation in similarity and less overlap; and FIG. 9C shows that wells 1 and 4 have no footprint overlap.

As discussed in greater detail below, in order to quantify the similarity between two footprints, the user may consider the concept of Jaccard similarity, which is a measure of the similarity between two sets computed by measuring the set intersection over the set union. Sets that are identical have a Jaccard similarity equal to one, whereas set that are disjoint have a similarity of zero. The Jaccard similarity can be interpreted as a measure of the "petrophysical similarity" between two wells. A closely related term is the Jaccard distance, which is simply one minus the Jaccard similarity. This distance can be interpreted as a measure of "petrophysical distance" between two wells and is the quantity that is used to cluster groups of wells by their data footprint.

Figure 10A:
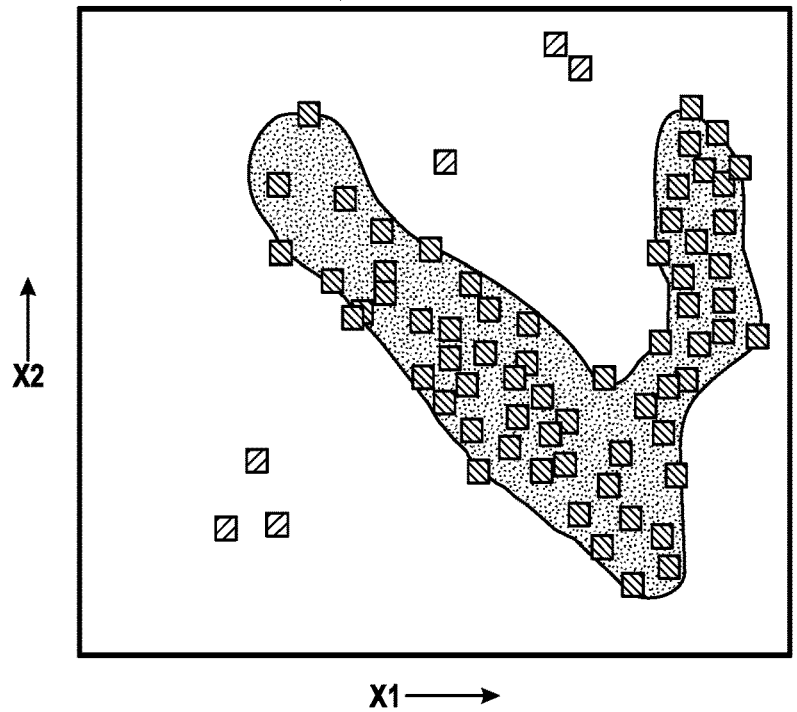
FIG. 10A illustrates a graph showing well 1 data, footprints, and outliers, according to an embodiment.
Figure 10B:
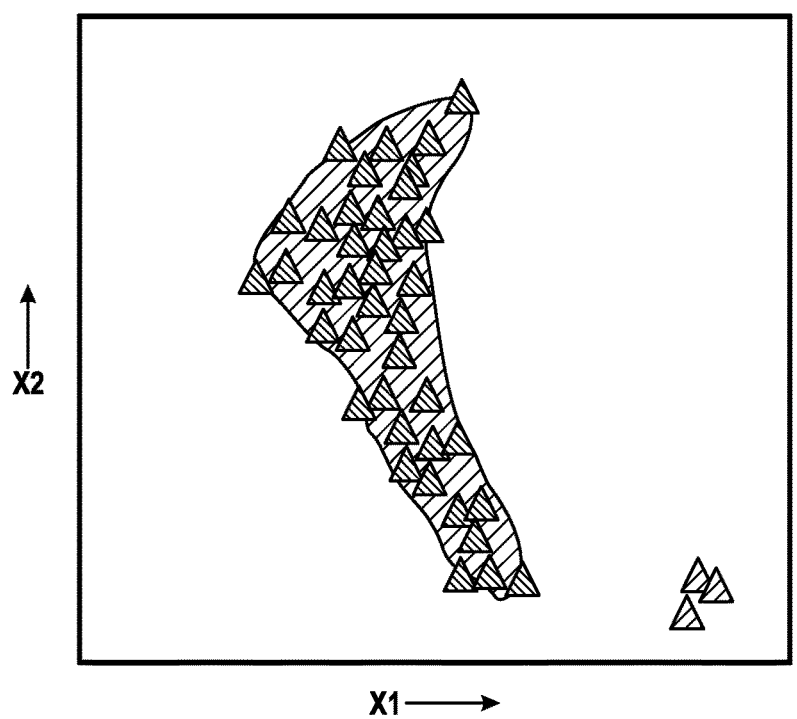
FIG. 10B illustrates a graph showing well 2 data, footprints, and outliers, according to an embodiment.
Figure 10C:
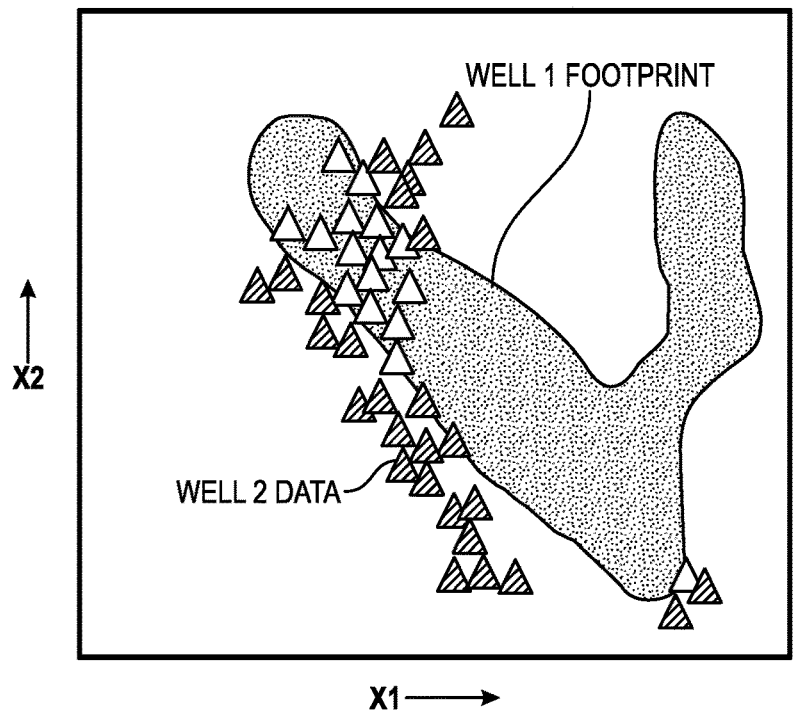
FIG. 10C illustrates a graph showing the well 1 footprint versus the well 2 data, according to an embodiment.
Figure 10D:
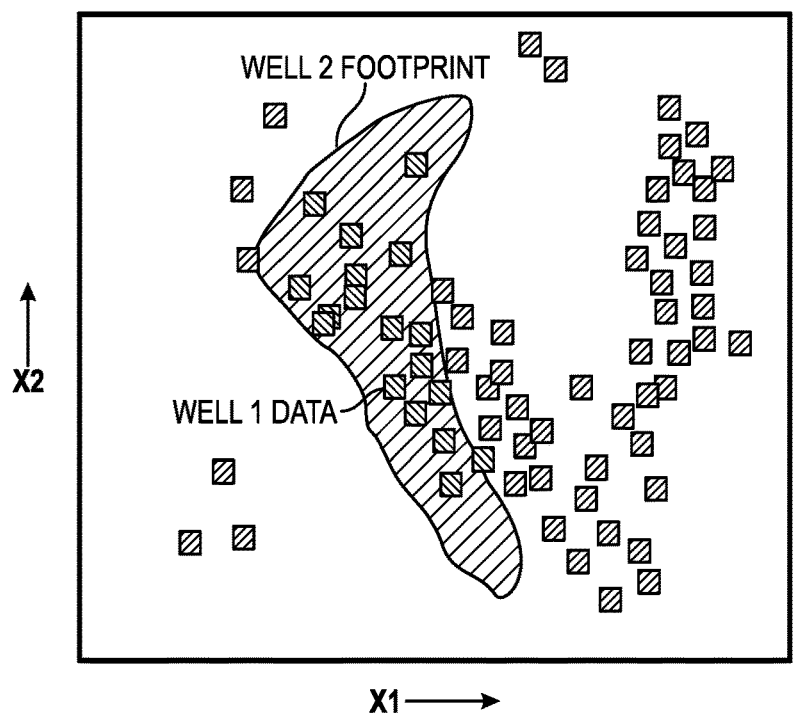
FIG. 10D illustrates a graph showing the well 2 footprint versus the well 1 data, according to an embodiment.

Rather than directly computing intersection and union of two multidimensional footprints like those shown in FIGS. 9A-9C, the sample data themselves may be used as the basis of the calculation. This avoids the problem of integrating the footprints in multi-dimensions. Instead, the calculation is based on simply counting the number of samples from the first well that fall inside the footprint of the second well and vice versa. Basing the distance calculation on the sample data automatically compensates for variations in the data density since mismatch between two footprints in regions where the data density is low has a smaller contribution to the overall Jaccard distance than mismatch in regions of high data density. FIGS. 10A and 10B illustrate the data and footprints computed from two wells using the one-class support vector machine. The footprints and data from wells 1 & 2 form the basis of the calculation of Jaccard distance. The data from well 2 is tested against the footprint of well 1 by classifying (or labelling) the data samples as normal or outlier, and likewise well 1 is tested against the footprint of well 2, as illustrated in FIGS. 10C and 10D. The data sample labelling from each case is used to calculate the Jaccard distance between wells 1 and 2 according to ALG 7.

Computing the distance between the pairs of wells defines a distance matrix that captures the structure of the multi well dataset. The information in the distance matrix can be interpreted as a graph network where each well is a node and the elements in the matrix define the length of the edges between the nodes. The distance matrix forms the basis of techniques for visualizing and clustering wells into groups that have a similar footprints.

Multi-dimensional scaling (MDS) of the inter-well distance matrix is a way to visualize its structure by projecting the wells into a low dimensional space, ideally two dimensional so that it can be easily visualized as a map. The idea is to compute coordinates of each well such that the distances between the wells in this new coordinate system approximates the inter-well distances in the matrix.

There are several ways to cluster wells based on the distance matrix. Hierarchical Agglomerative Clustering (HAC) produces a tree-like representation of the inter-well distances in which clusters at a given level in the hierarchy are formed by merging clusters at the next level down. The clusters chosen for merging are the pair that are most similar. At the lowest level, each cluster contains a single well. At the highest, there is a single cluster containing each of the wells.

Spectral clustering (SC) is another method for clustering the distance matrix that splits the distance graph into clusters such that wells (or nodes) which are near are assigned to same cluster and those that are far are assigned to different clusters.

This suggests the following workflow for identifying groups of wells that share the same patterns of log measurements:
1. Input a number of wells and select the log curves to be used for analysis.
2. Compute the footprint of each well in turn by training a one-class support vector machine on its input logs.
3. For each possible pair of wells, compute the sample-wise Jaccard distance (equal to one minus the Jaccard similarity) by testing the footprint of the first well with the sample data of the second and vice versa.
4. Store the Jaccard distance between each pair of wells in a distance matrix.
5. Compute the Multi-Dimensional Scaling (MDS) of the inter-well distance matrix.
6. Compute a clustering of the inter-well distance matrix. Various methods can be employed to perform the clustering, including Hierarchical Agglomerative Clustering (HAC) and Spectral Clustering (SC).
7. Use the results from 5 & 6 to visualize the structure of the inter-well distance matrix:
   a. Two of the coordinates from the MDS can be used to create a pseudo map view where the plotted distances between the wells approximate the distances in the inter-well distance matrix. Wells which plot close together have similar log footprints.
   b. The clustering results from the HAC can be used to define a dendrogram view of the inter-well distance matrix where the branching structure defines multiple clusters of similar wells. Setting a distance threshold defines a cluster label for each well. Wells which are assigned the same label have similar log footprints.
   c. Cluster labelling derived from methods such as HAC and SC can be displayed in a standard map form in order to visualize spatial relationships in the cluster assignments and to answer questions such as: "Do wells that belong to the same clusters also cluster together spatially?" or "Does the well clustering reveal any links to the underlying geology?".

ALG12 is an abstraction of the workflow to compute the inter-well distance matrix as described in 1 to 4 above. FIGS. 11A, 11B, and 11C illustrates the complete workflow. An inter-well distance matrix for 6 wells is shown in FIG. 11A representing the petrophysical distances between pairs of wells based on their openhole logs. A diagnostic plot for MDS in FIG. 11B shows that the inter-well distances can be approximately reproduced using the first two MDS coordinates. In FIG. 11C, the wells are plotted according to the first two MDS coordinates giving a pseudo map display where similar wells plot close together and dissimilar wells plot far apart. The arrangement of wells in FIG. 11C shows that 3 wells which are very similar can be grouped together to form cluster 1. A further 2 wells can be grouped to form cluster 2 whereas the remaining well is far from the others and is probably an outlier.

Algorithm Definitions

In this section, pseudo code is provided for the various algorithms. A specific algorithm is referred to by its algorithm number (such as ALG1 for the ComputePredictionError algorithm), rather than its full name for ease of use.

```
ALG1: ComputePredictionErrorRF
[bias, MAE, MSE, RMSE] = ComputePredictionErrorRF
  (X^{train}, Y^{train}, X^{test}, Y^{test})
    M_{RF} = createModel(X^{train}, Y^{train}, 'RF')
    Y_p^{test} = predict(M_{RF}, X^{test})
    E = Y_p^{test} - Y^{test}
              bias = sum(E)/length(E)
              MAE = sum(abs(E))/length(E)
              MSE = sum(trans(E) * E)/length(E)
              RMSE = sqrt(sum(trans(E) * E)/length(E)
ALG2: LOOWCVRF
          [errorSummary] = LOOWCVRF(X^W, Y^W)
                W = setOfWells(X^W)
                for each k in W
                    S = W - {k}
      errorSummary(k) = ComputePredictionErrorRF(X^S, Y^S, X^k, Y^k)
ALG3: LOOLCVRF
          [errorSummary] = LOOLCVRF(X^W)
  J = setOfColumns(X^W)
                for each j in J
                    S = J - {j}
      errorSummary(j) = ComputePredictionErrorRF(X^S, X^j, X^S, X^j)
ALG4: LOOWOLCVRF
          [errorSummary] = LOOWOLCVRF(X^W)
                W = setOfWells(X^W)
```

-continued

```
J = setOfColumns(X^W)
        for each k in W
            S = W − {k}
            for each j in J
                L = J − {j}
    errorSummary(k, j) = ComputerPredictionErrorRF(X_L^S, X_j^S, X_L^k, X_j^k).
ALG5: GetOutlierClassification
[C^test] = GetOutlierClassification (X^train, X^test, outLierFraction) {M_SVM =
createModel(X^train, 'SVM', outLierFraction)
    Y_d^test = predict(M_SVM, X^test)
    C^test = classify(Y_d^test)
ALG6: FindOutliers
[fractionOut] = FindOutliers (X^W, outlierFraction)
    C^W = getOutlierClassification(X^W, X^W, outlierFraction)
```

$$\text{fractionIn} = \frac{\text{sum}(C^W)}{\text{length}(C^W)}$$

```
fractionOut = 1 − fractionIn
logView(X^W, C^W).
ALG7: ComputeJaccardDistance
[d] = ComputeJaccardDistance(X^1, X^2, outlierFraction)
    M_SVM^1 = createModel(X^1, 'SVM', outlierFraction)
    M_SVM^2 = createModel(X^2, 'SVM', outlierFraction)
    D_21 = predict(M_SVM^2, X^1)
    D_12 = predict(M_SVM^1, X^2)
    D_22 = predict(M_SVM^2, X^2)
    C_21 = classify(D_21)
    C_12 = classify(D_12)
    C_22 = classify(D_22)
```

$$d = 1 - \left(\frac{\text{sum}(C_{21}) + \text{sum}(C_{12})}{\text{sum}(C_{21}) + \text{sum}(C_{12}) + \text{sum}(C_{22})}\right)$$

```
ALG8: LOOWCVSVM
    [fracOut] = LOOWCVSVM(X^W, outLierFraction)
        W = setOfWells(X^W)
        for each k in W
            S = W − {k}
            C^k = getOutlierClassification(X^S, X^k, outlierFraction)
```

$$\text{fracOut}(k) = 1 - \left(\frac{\text{sum}(C^k)}{\text{length}(C^k)}\right)$$

```
ALG9: LOOLCVSVM
    [fracOut] = LOOLCVSVM(X^W, outLierFraction)
J = setOfColumns(X^W)
        for each j in J
            S = J − {j}
            C^j = getOutlierClassification(X^S, X^S, outlierFraction)
```

$$\text{fracOut}(j) = 1 - \left(\frac{\text{sum}(C^j)}{\text{length}(C^j)}\right)$$

```
ALG10: LOOWOLCVSVM
    [fracOut] = LOOWOLCVSVM(X^W, outLierFraction)
        W = setOfWells(X^W)
J = setOfColumns(X^W)
for each k in W {
            S = W − {k}
            for each j in J
                L = J − {j}
    C = getOutlierClassification(X_L^S, X_L^k, outlierFraction)
```

$$\text{fracOut}(k, j) = 1 - \left(\frac{\text{sum}(C)}{\text{length}(C)}\right)$$

```
ALG11: RankModels
    [sortedModelIndex] = RankModels(X^M, X^query, outLierFraction)
        for k in M
            d(k) = ComputeJaccardDistance(X^k, X^query, outlierFraction)
    sortedModelIndex = sort(d)
ALG12. ComputeInterWellDistances
    [d] = ComputeInterWellDistances(X^W, outLierFraction)
        for k in W
            for j in W
                d(k, j) = ComputeJaccardDistance(X^k, X^j, outlierFraction)
```

Petrophysical Similarity Analysis

Description of Similarity Metrics—Jaccard Similarity

Jaccard similarity is a measure of the similarity between two sets computed as the size of the intersection over the size of the union. Sets that are identical have a Jaccard similarity of one, whereas sets that are disjoint have a similarity of zero.

Rather than directly computing the intersection and union of two multi-dimensional footprints, the sample data is used as the basis of the calculation. This avoids the problem of integrating the footprints in multiple dimensions. Instead, the intersection calculation is based on counting the number of samples that fall inside both footprints, and the union calculation is based on counting the number of samples that fall inside either footprint.

Basing the similarity calculation on the sample data automatically compensates for variations in the data density because the mismatch between two footprints in regions where the data density is low has a smaller contribution to the overall Jaccard similarity than mismatch in regions of high data density.

Jaccard($A,B$)=(size of $A$ intersection $B$)/(size of $A$ union $B$)

or:

Jaccard($A,B$)=(number in footprint $A$ and $B$)/(number in footprint $A$+number in footprint $B$−number in footprint $A$ and $B$)

By definition, Jaccard similarity is symmetric, i.e., Jaccard(A, B)=Jaccard(B,A) and has a value between one and zero.

Overlap Similarity

Jaccard similarity is not sensitive to situations where the footprint of well A is a subset of well B. In these situations, Jaccard similarity will be less than one, even if the footprint of well A is completely contained within the footprint of well B. A user may identify these situations because, in this case, well B would be a strong candidate to build a predictive model to reconstruct logs in well A. Overlap similarity provides a way to identify such overlaps.

Overlap($A,B$)=(size of $A$ intersection $B$)/min(size of $A$,size of $B$)

or:

Overlap($A,B$)=(number in footprint $A$ and $B$)/min (number in footprint $A$,number in footprint $B$)

By definition, Overlap similarity is symmetric i.e., Overlap(A,B)=Overlap(B,A) and has a value between one and zero. In contrast to Jaccard similarity, Overlap similarity is equal to one when footprint A is entirely a subset of footprint B or vice versa.

Overlap Indicator

On its own, the Overlap similarity does not tell a user which well footprint A or B is the subset, but it is trivial to obtain this information as the subset well is the one which is selected by the minimum in the denominator. In the displays, this is shown as the subset/superset matrix. To interpret this matrix, take the row of well A and read across the columns to tell if well A is a subset or a superset relative to well B in a particular column.

Overlap Similarity by Row

In the Overlap similarity calculation, the denominator is selected to be the smaller of A and B, and this choice identifies which footprint is the subset (smaller) and which is the superset (larger). Overlap similarity by row is an extension of Overlap similarity designed to probe the degree to which footprint A is a subset of footprint B. This is done by forcing the choice of footprint A in the denominator.

Overlap by Row$(A,B)$=(size of $A$ intersection $B$)/(size of $A$)

or:

Overlap by Row$(A,B)$=(number in footprint $A$ and $B$)/(number in footprint $A$)

In the displays, this is shown as the Overlap by row matrix. To interpret this matrix, a user may take the row of well A and read across the columns to tell the extent to which well A overlaps relative to well B in a particular column.

Overlap by row takes a value between one and zero but is not symmetric i.e., Overlap by Row(A,B)!=Overlap by Row(B,A) and cannot be directly used in MDS etc. without modifications such as averaging the lower and upper triangles.

One-Way Overlap Similarity by Row

The previous measures combine the data points from wells A and B into one set and use the combined set to probe the similarity between the two footprints. This measure adopts a different approach of comparing the data points from well A to the footprint of well B. The calculation gives the fraction of data points from well A that fall in the footprint of well B.

One-way Overlap by Row(A,B)=(number of well A data points in footprint B)/(number of well A data points).

In the displays, this is shown as the One-way Overlap by Row matrix. To interpret this matrix, take the row of well A and read across the columns to tell the fraction of data from well A that falls in the footprint of well B in a particular column.

One-way Overlap by Row takes a value between one and zero but is not symmetric i.e., One-way Overlap by Row (A,B)!=One-way Overlap by Row(B,A).

Methods for Creating a Symmetric Similarity Matrix

Similarity metrics that are not symmetric cannot be directly used in MDS etc. without modification to force symmetry. Two methods are used to do this:

(a) Take the average of the elements in the lower and upper triangles, i.e.,

Average Overlap by Row$(A,B)$=0.5(Overlap by Row $(A,B)$+Overlap by Row$(B,A)$)

or (b) Take the product of the elements in the lower and upper triangles, i.e.,

Product Overlap by Row$(A,B)$=Overlap by Row$(A,B)$*Overlap by Row$(B,A)$

Extending Similarity Metrics with Spatial Proximity

The similarity metrics described above represent the similarity of petrophysical responses between wells. There is also information in the relative spatial location of the wells that may be used to weight the similarity of their petrophysical responses. Two wells that are relatively close spatially should have their petrophysical similarity weighted more highly than two wells that are further apart. A spatial proximity matrix is defined as a measure of proximity for each pairs of wells:

Spatial Proximity$(A,B)=e^{-\|x_A-x_B\|^2/\sigma}$

Where $x_A$ and $x_B$ are the spatial coordinates of wells A and B respectively, e.g., the position of the well head or the average position of the zone of interest in the subsurface when the well is deviated or is a lateral. The proximity metric defined above is close to 1 when the wells are near, and close to 0 when the wells are far apart. The range parameter $\sigma$ controls the distance at which the proximity approaches zero. There are other proximity functions that could be used in the function above, the one shown in a Gaussian function.

Modifications of spatial proximity are also possible to incorporate geological knowledge, e.g., proximity can be penalized when the separation vector between wells crosses a fault. Spatial proximity can be combined with any of the petrophysical similarity metrics described in the previous section. The combined similarity metric can be calculated by two methods as:

(a) The product of the petrophysical similarity metric and spatial proximity:

Combined Similarity$(A,B)$=Petrophysical Similarity $(A,B)$*Spatial Proximity$(A,B)$ or (b) A weighted linear combination of the petrophysical similarity metric and spatial proximity, where W is the mixing weight which can be set between 0 and 1:

Combined Similarity$(A,B)=W$*Petrophysical Similarity$(A,B)+(1-W)$*Spatial Proximity$(A,B)$.

In case (b), the mixing weight controls the contribution of the petrophysical and spatial components in the output. W=0 gives pure spatial proximity, W=1 give pure petrophysical similarity, 0<W<1 gives a blend.

Interpretation of the Similarity Matrix Using the PageRank Algorithm

The PageRank algorithm may be used to sort wells according their relevance in the similarity matrix, where the relevance of a well is a measure of the strength of its footprint similarity compared to the other wells. The process produces a list of wells ranked by the relevance of their footprints in representing the petrophysical responses seen in the entire dataset.

The process includes:
1. Computing a symmetric similarity matrix for a number of wells using one of the metrics outlined above.
2. Running the PageRank algorithm on the similarity matrix.
3. Obtaining a list of the input wells ranked by relevance in the matrix.
4. Interpreting wells that are ranked at or near the top of the list as wells that exhibit the most representative petrophysical responses out of the entire dataset, and interpreting wells that are ranked near the bottom of the list as exhibiting anomalous petrophysical responses.

Figure 12:
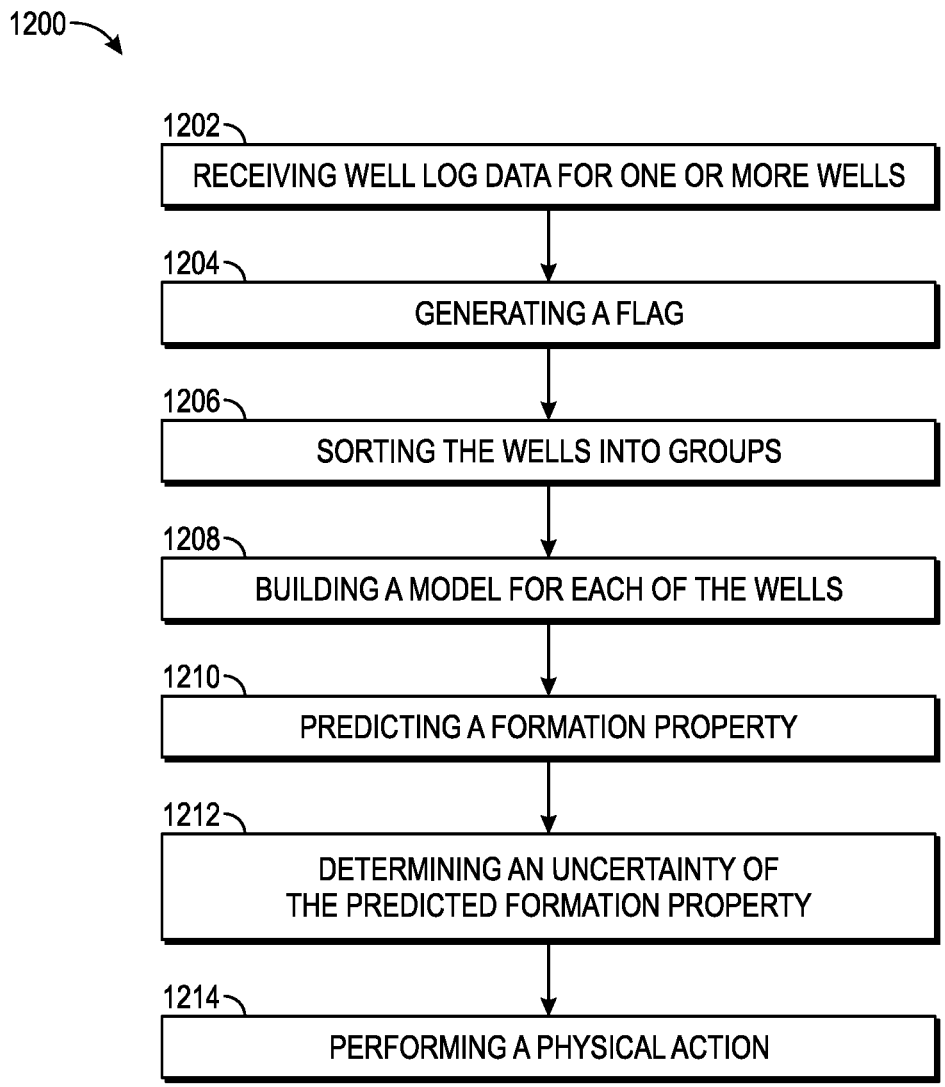
FIG. 12 illustrates a flowchart of a method for predicting a formation property, according to an embodiment.

FIG. 12 illustrates a flowchart of a method 1200 for predicting a formation property, according to an embodiment. The method 1200 may include receiving well log data for one or more (e.g., a plurality of) wells, as at 1202. The well log data may be captured by a downhole tool (e.g., a wireline tool, a logging-while-drilling (LWD) tool, or a measurement-while-drilling (MWD) tool). In another embodiment, the well log data may be captured at the surface by analyzing mud logs, drilling data, cuttings, and/or core data. The well log data may include gamma ray measurements, density measurements, neutron logs, core data, and the like. The well log data may be captured and/or received in real-time.

The method 1200 may also include generating a flag, as at 1204. The flag may be generated using the well log data. The flag is a variable with a binary value (e.g., either 0 or 1). The flag may be an outlier flag or an inlier flag. If the flag is an outlier flag, a 1 represents an outlier, and a 0 represents an inlier. If the flag is an inlier flag, a 1 represents an inlier, and a 0 represents an outlier. An outlier flag indicates a valid measurement of formation properties that is not represented in a training set, or a measurement that is in error due to tool failures or bad wellbore conditions. An inlier flag is the complement of the outlier flag.

The outlier flag may be generated using a one-class unsupervised support vector machine (SVM) model. The SVM model may be generated using an outlier fraction that is user-supplied or automated. The SVM model may be generated on a well-by-well basis, a global basis, or both, as described above.

The method 200 may also include sorting the wells into groups, as at 1206. The wells may be sorted based on the well log data and/or the flag. The wells may be sorted into groups using a petrophysical similarity analysis. The petrophysical similarity analysis may include computing a similarity matrix using the well log data and/or the flag. The similarity metrics used in the similarity analysis may include Jaccard, overlap, etc., as described in greater detail above. The results from the similarity analysis may be visualized.

The wells may be sorted into groups on a well-by-well basis (e.g., using one or more of the similarity metrics). In another embodiment, the wells may be sorted into groups using dimension reduction via multi-dimensional scaling (MDS). This may be done by applying clustering to the results of the MDS, and the results of the MDS (e.g., one or more matrices) may be visualized. In yet another embodiment, the wells may be sorted into groups using a combined metric utilizing spatial well proximity.

The method 1200 may also include building a model for each of the wells, as at 1208. The model may be built using the well log data, the flag, and/or the groups. Once built, the model(s) may be added to a library of models. The model(s) may be updated when additional ground truth becomes available. In at least one embodiment, the library may be searched for a model that corresponds to one or more of the wells, and, if the model is not found in the library, then the model may be built.

The method 1200 may also include predicting a formation property, as at 1210. The formation property may be predicted using the well log data and/or the model(s) (e.g., the built model, the models in the library, or both). The formation property may be or include water saturation, porosity, permeability, compressional slowness, and the like. In at least one embodiment, the well log data used to predict the formation property may be or include mud log data, drilling data, and gamma ray data.

The method 1200 may also include determining an uncertainty of the predicted formation property, as at 1212. The uncertainty may be predicted using one or more prediction intervals from the Quantile Regression Forest (QRF).

The method 1200 may also include performing a physical action, as at 1214. The physical action may be performed (e.g., automatically) in response to the formation property and/or the uncertainty. The physical action may include identifying/selecting an additional well to be interpreted manually by a human, reviewing a logging program, changing a drilling plan for a well (e.g., steering to change the trajectory), varying properties of fluid (e.g., mud) being pumped into a well, actuating a valve, or the like. In at least one embodiment, predicted formation property and/or the uncertainty may then result in a notification to a user that instructs the user to analyze one of the wells in more detail (e.g., manually).

Figure 13:
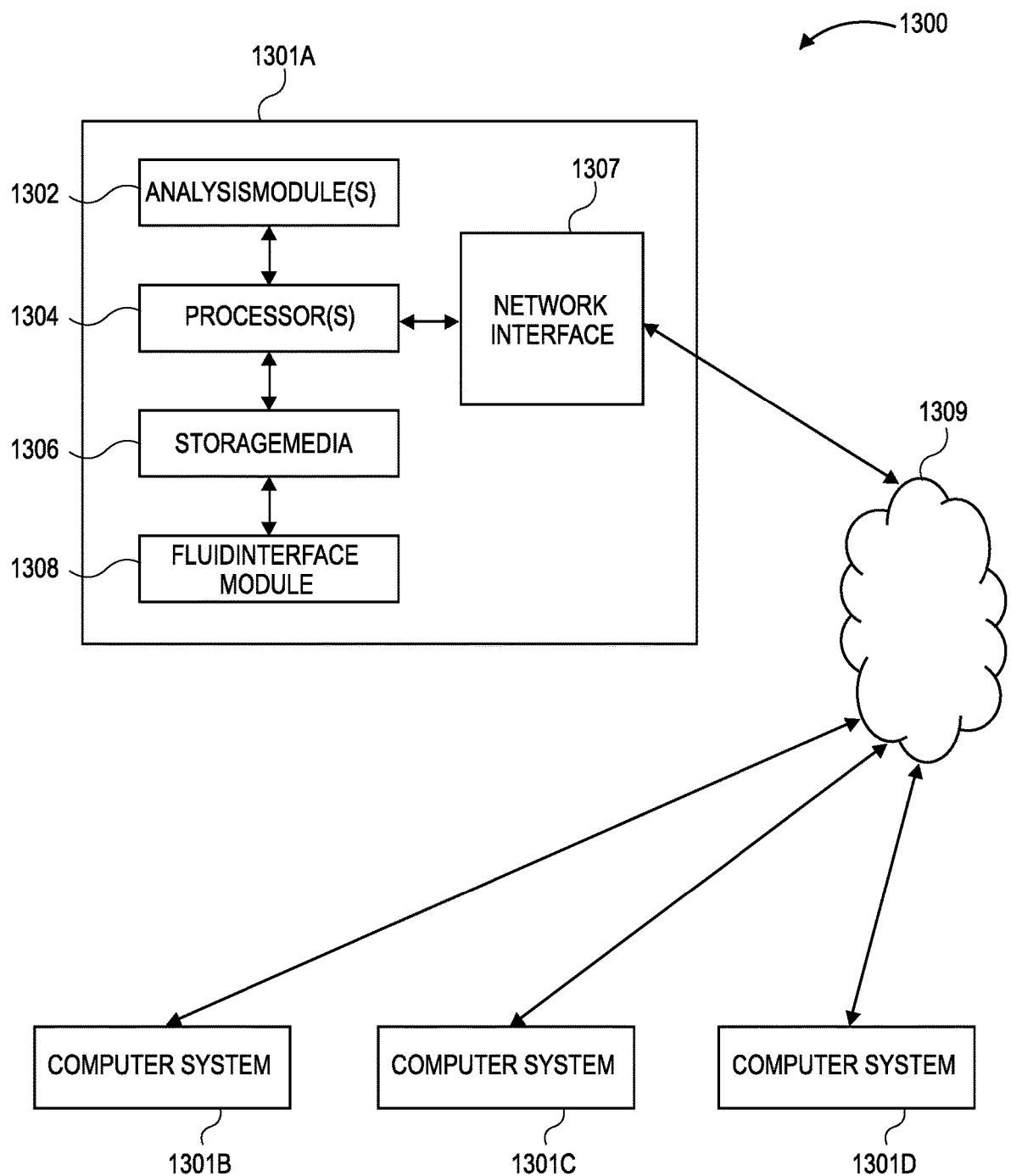
FIG. 13 illustrates a schematic view of a computing system, according to an embodiment.

FIG. 13 illustrates a schematic view of a computing system 1300, according to an embodiment. The computing system 1300 may include a computer or computer system 1301A, which may be an individual computer system 1301A or an arrangement of distributed computer systems. The computer system 1301A includes one or more analysis module(s) 1302 configured to perform various tasks according to some embodiments, such as one or more methods disclosed herein. To perform these various tasks, the analysis module 1302 executes independently, or in coordination with, one or more processors 1304, which is (or are) connected to one or more storage media 1306. The processor(s) 1304 is (or are) also connected to a network interface 1307 to allow the computer system 1301A to communicate over a data network 1309 with one or more additional computer systems and/or computing systems, such as 1301B, 1301C, and/or 1301D (note that computer systems 1301B, 1301C and/or 1301D may or may not share the same architecture as computer system 1301A, and may be located in different physical locations, e.g., computer systems 1301A and 1301B may be located in a processing facility, while in communication with one or more computer systems such as 1301C and/or 1301D that are located in one or more data centers, and/or located in varying countries on different continents).

A processor can include a microprocessor, microcontroller, processor module or subsystem, programmable integrated circuit, programmable gate array, or another control or computing device.

The storage media 1306 can be implemented as one or more computer-readable or machine-readable storage media. Note that while in the example embodiment of FIG. 13 storage media 1306 is depicted as within computer system 1301A, in some embodiments, storage media 1306 may be distributed within and/or across multiple internal and/or external enclosures of computing system 1301A and/or additional computing systems. Storage media 1306 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLU-RAY® disks, or other types of optical storage, or other types of storage devices. Note that the instructions discussed above can be provided on one computer-readable or machine-readable storage medium, or can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In some embodiments, computing system 1300 contains one or more formation property prediction module(s) 1308. In some embodiments, a single formation property prediction module 1308 may be used to perform at least some aspects of one or more embodiments of the methods. In other embodiments, a plurality of formation property prediction modules 1308 may be used to perform at least some aspects of the methods.

It should be appreciated that computing system 1300 is one example of a computing system, and that computing system 1300 may have more or fewer components than shown, may combine additional components not depicted in the example embodiment of FIG. 13, and/or computing system 1300 may have a different configuration or arrangement of the components depicted in FIG. 13. The various components shown in FIG. 13 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are included within the scope of protection of the invention.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. Moreover, the order in which the elements of the methods are illustrated and described may be re-arranged, and/or two or more elements may occur simultaneously. The embodiments were chosen and described in order to best explain the principals of the invention and its practical applications, to thereby enable others skilled in the art to best utilize the invention and various embodiments with various modifications as are suited to the particular use contemplated.

What is claimed is:

1. A method, comprising:
  receiving well log data for a first well;
  generating a first footprint defining a decision boundary for the first well using a support vector machine, at least some of the well log data is outside of the first footprint and at least some of the well log data is within the first footprint;
  comparing the first footprint to a second footprint generated using a model representing one or more second wells, the model is configured to predict a formation property based at least in part on well log data for the one or more second wells;
  determining that the first well is similar to the one or more second wells based on the comparing;
  predicting the formation property of the first well using the model, based at least partially on the well log data; and
  updating the model based at least partially on the well log data from the first well, in response to determining that the first well is similar to the one or more second wells.

2. The method of claim 1, further comprising capturing the well log data downhole using a downhole tool that is positioned in the first well.

3. The method of claim 1, further comprising capturing the well log data at the surface of the first well.

4. The method of claim 1, wherein the well log data comprises a gamma ray measurement, mud log data, and drilling data, and wherein the formation property comprises water saturation and total porosity.

5. The method of claim 1, further comprising determining an uncertainty of the formation property using one or more prediction intervals from a quantile regression forest algorithm.

6. The method of claim 5, further comprising performing a physical action in response to determining the formation property, the uncertainty of the formation property, or both.

7. The method of claim 6, wherein the physical action is selected from the group consisting of: selecting an additional well to be interpreted manually, changing a trajectory of one of the wells, and varying a property of a fluid being pumped into one of the wells.

8. The method of claim 1, further comprising generating a flag based at least partially on the well log data, wherein the flag comprises a binary value, wherein the flag indicates whether a sample in the well log data comprises an error.

9. The method of claim 1, wherein the support vector machine is a one-class support vector machine model, wherein the decision boundary is defined by a first portion of samples in the well log data.

10. The method of claim 9, wherein the decision boundary extends through the first portion of the samples and encompasses a second portion of the samples in the well log data, and wherein a third portion of the samples in the well log data are outside of the decision boundary.

11. The method of claim 10, wherein the third portion of the samples comprises an outlier fraction of the samples, and wherein the decision boundary is generated based at least partially upon the outlier fraction.

12. The method of claim 9, wherein the decision boundary comprises a plurality of decision boundaries corresponding to different zones, facies, fluids, or a combination thereof associated with the first well.

13. The method of claim 1, wherein comparing includes at least one of:
  determining an amount of overlap of the first and second footprints; or
  counting a number of samples of the well log data associated with the first well that are within the second footprint and a number of samples of well log data associated with the second well that are within the first footprint.

14. The method of claim 1, further comprising:
  obtaining a base-base error vector for the model before updating the model;
  creating a new well domain by adding the well log data for the first well to the model;
  obtaining a new error vector for the model based on the new well domain; and
  determining that the new error vector is below a threshold.

15. A computing system comprising:
one or more processors; and
a memory system comprising one or more non-transitory computer-readable media storing instructions that, when executed by at least one of the one or more processors, cause the computing system to perform operations, the operations comprising:
   receiving well log data for a plurality of wells;
   generating a flag based at least partially on the well log data, wherein the flag comprises a binary value;
   sorting the wells into groups based at least partially on the well log data, the flag, or both;
   building one or more models for the wells based at least partially on the well log data, the flag, and the groups, building the one or more models includes:
      generating a first footprint defining a decision boundary for a first well of the plurality of wells using a support vector machine model, at least some of the well log data associated with the first well is outside of the first footprint and at least some of the well log data associated with the first well is within the first footprint;
      comparing the first footprint to a second footprint generated using the model representing one or more second wells, the model is configured to predict one or more formation parameters based at least in part on well log data;
      determining that the first well is similar to the one or more second wells based on the comparing; and
      updating the model representing the one or more second wells based at least partially on the well log data from the first well, in response to determining that the first well is similar to the one or more second wells;
   predicting a formation property based at least partially upon the well log data and the one or more models;
   determining an uncertainty of the formation property using one or more prediction intervals from a quantile regression forest algorithm; and
   identifying a physical action to be performed in response to the formation property, the uncertainty of the formation property, or both.

16. The computing system of claim 15, wherein the flag comprises an outlier flag that is generated using the support vector machine model, the support vector machine model being a one-class unsupervised support vector machine model.

17. The computing system of claim 16, wherein the one-class unsupervised support vector machine model is generated using an outlier fraction that is user-supplied or automated.

18. The computing system of claim 16, wherein the one-class unsupervised support vector machine model is generated on a well-by-well basis, a global basis, or both.

19. The computing system of claim 15, wherein the wells are sorted into the groups using a petrophysical similarity analysis that includes determining a similarity matrix using the well log data, the flag, or both.

20. The computing system of claim 15, wherein the wells are sorted into the groups on a well-by-well basis using one or more similarity metrics selected from the group consisting of Jaccard similarity, overlap similarity, overlap indicator, overlap similarity by row, one-way similarity by row, and a symmetric similarity matrix.

21. The computing system of claim 15, wherein the wells are sorted into the groups using dimension reduction via multi-dimensional scaling, by applying clustering to results of the multi-dimensional scaling.

22. The computing system of claim 15, wherein the wells are sorted into the groups using a combined metric utilizing spatial well proximity.

23. The computing system of claim 15, further comprising:
   adding the one or more models to a library after the one or more models are built; and
   updating the one or more models in the library when additional ground truth becomes available.

24. The computing system of claim 15, wherein the formation property is selected from the group consisting of water saturation, porosity, permeability, and compressional slowness.

25. The computing system of claim 15, further comprising searching a library of models for the one or more models, and if the one or more models are not present in the library, then building the one or more models for the wells based at least partially on the well log data, the flag, and the groups.

26. A non-transitory computer-readable medium storing instructions that, when executed by at least one processor of a computing system, cause the computing system to perform operations, the operations comprising:
   receiving well log data for a plurality of wells, wherein the well log data is selected from the group consisting of gamma ray measurements, density measurements, neutron logs, and core data;
   generating a flag based at least partially on the well log data, wherein the flag comprises a binary value that identifies whether a sample in the well log data is an outlier or an inlier, wherein the flag is generated using a one-class unsupervised support vector machine model, and wherein the one-class unsupervised support vector machine model is generated on a well-by-well basis, a global basis, or both using an outlier fraction that is user-supplied or automated;
   sorting the wells into groups based at least partially on the well log data, the flag, or both;
   building a model for each of the wells based at least partially on the well log data, the flag, and the groups;
   adding the models to a library after the models are built;
   updating the models in the library when additional ground truth becomes available updating the models includes:
      generating a first footprint defining a decision boundary for a first well of the plurality of wells using a support vector machine model, at least some of the well log data associated with the first well is outside of the first footprint and at least some of the well log data associated with the first well is within the first footprint;
      comparing the first footprint to a second footprint generated using the model representing one or more second wells, the model is configured to predict one or more formation parameters based at least in part on well log data;
      determining that the first well is similar to the one or more second wells based on the comparing; and
      updating the model based at least partially on the well log data from the first well, in response to determining that the first well is similar to the one or more second wells;
   predicting a formation property based at least partially upon the well log data and the models, wherein the formation property is selected from the group consisting of water saturation, porosity, permeability, and compressional slowness;

determining an uncertainty of the formation property using one or more prediction intervals from a quantile regression forest algorithm; and identifying a physical action to be performed in response to the formation property, the uncertainty of the formation property, or both, wherein the physical action is selected from the group consisting of selecting an additional well to be interpreted manually, changing a trajectory of one of the wells, and varying a property of a fluid being pumped into one of the wells.

* * * * *